US012701572B2

(12) United States Patent
Elshafie et al.

(10) Patent No.: US 12,701,572 B2
(45) Date of Patent: Aug. 4, 2026

(54) ADVANCED CODING FOR UPLINK AND DOWNLINK TRANSMISSIONS

(71) Applicant: QUALCOMM Incorporated, San Diego, CA (US)

(72) Inventors: Ahmed Elshafie, San Diego, CA (US); Huilin Xu, Temecula, CA (US); Ahmed Attia Abotabl, San Diego, CA (US); Marwen Zorgui, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 781 days.

(21) Appl. No.: 18/150,125

(22) Filed: Jan. 4, 2023

(65) Prior Publication Data

US 2024/0224276 A1 Jul. 4, 2024

(51) Int. Cl.
*H04W 72/1273* (2023.01)
*H04L 1/00* (2006.01)
*H04W 72/21* (2023.01)

(52) U.S. Cl.
CPC ....... *H04W 72/1273* (2013.01); *H04L 1/0009* (2013.01); *H04W 72/21* (2023.01)

(58) Field of Classification Search
CPC . H04W 72/1273; H04W 72/21; H04W 72/23; H04L 1/0009
See application file for complete search history.

(56) References Cited

U.S. PATENT DOCUMENTS

| | | | | |
|---|---|---|---|---|
| 2008/0086675 A1* | 4/2008 | Wu | ..................... | H03M 13/1105 714/755 |
| 2008/0222480 A1* | 9/2008 | Huang | .............. | H03M 13/2906 714/752 |
| 2008/0222481 A1* | 9/2008 | Huang | .............. | H03M 13/2909 714/752 |
| 2010/0218066 A1* | 8/2010 | Okamura | .......... | H03M 13/6362 714/752 |
| 2012/0170541 A1* | 7/2012 | Love | ..................... | H04L 5/0094 370/329 |
| 2023/0085085 A1* | 3/2023 | Galbraith | .............. | H04L 1/0061 714/776 |
| 2023/0118018 A1* | 4/2023 | Guo | ..................... | H04L 1/0069 370/328 |
| 2025/0286565 A1* | 9/2025 | Ball | ................... | H03M 13/1105 |

* cited by examiner

*Primary Examiner* — Habte Mered
(74) *Attorney, Agent, or Firm* — Holland & Hart LLP

(57) ABSTRACT

Methods, systems, and devices for wireless communications support advanced coding for uplink and downlink transmissions are described. A user equipment (UE) may receive, from a network entity, control signaling indicating an erasure encoding pattern information associated with an erasure encoding scheme supported by the UE, and may receive scheduling information that allocates multiple resources on a shared channel for communication with the network entity. The UE and network entity may transmit or receive multiple transport blocks (TBs) and erasure encoded parity information corresponding to the multiple TBs via the multiple resources on the shared channel according to an erasure encoding pattern in accordance with the erasure encoding pattern information.

30 Claims, 16 Drawing Sheets

Time

300

510

520

515

505

500

Receiver

Communications Manager

Transmitter

910

920

915

905

900

130

105

115

Network
Entity

Transceiver

1210

Antenna

1215

Communications
Manager

1220

Memory

Code

1230

1225

1240

Processor

1235

1205

1200

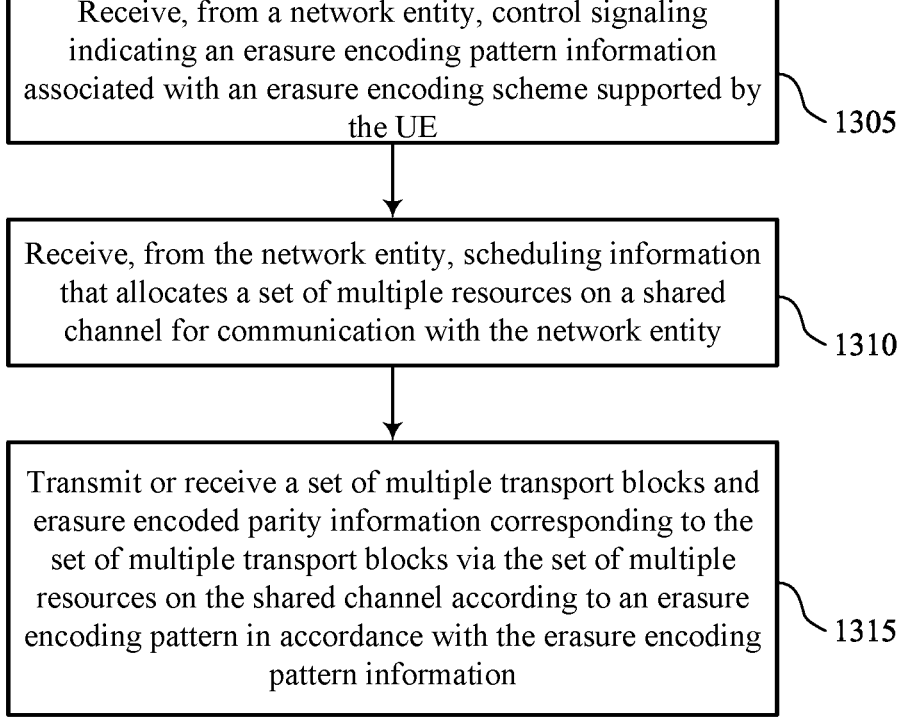

Receive, from a network entity, control signaling indicating an erasure encoding pattern information associated with an erasure encoding scheme supported by the UE

1305

Receive, from the network entity, scheduling information that allocates a set of multiple resources on a shared channel for communication with the network entity

1310

Transmit or receive a set of multiple transport blocks and erasure encoded parity information corresponding to the set of multiple transport blocks via the set of multiple resources on the shared channel according to an erasure encoding pattern in accordance with the erasure encoding pattern information

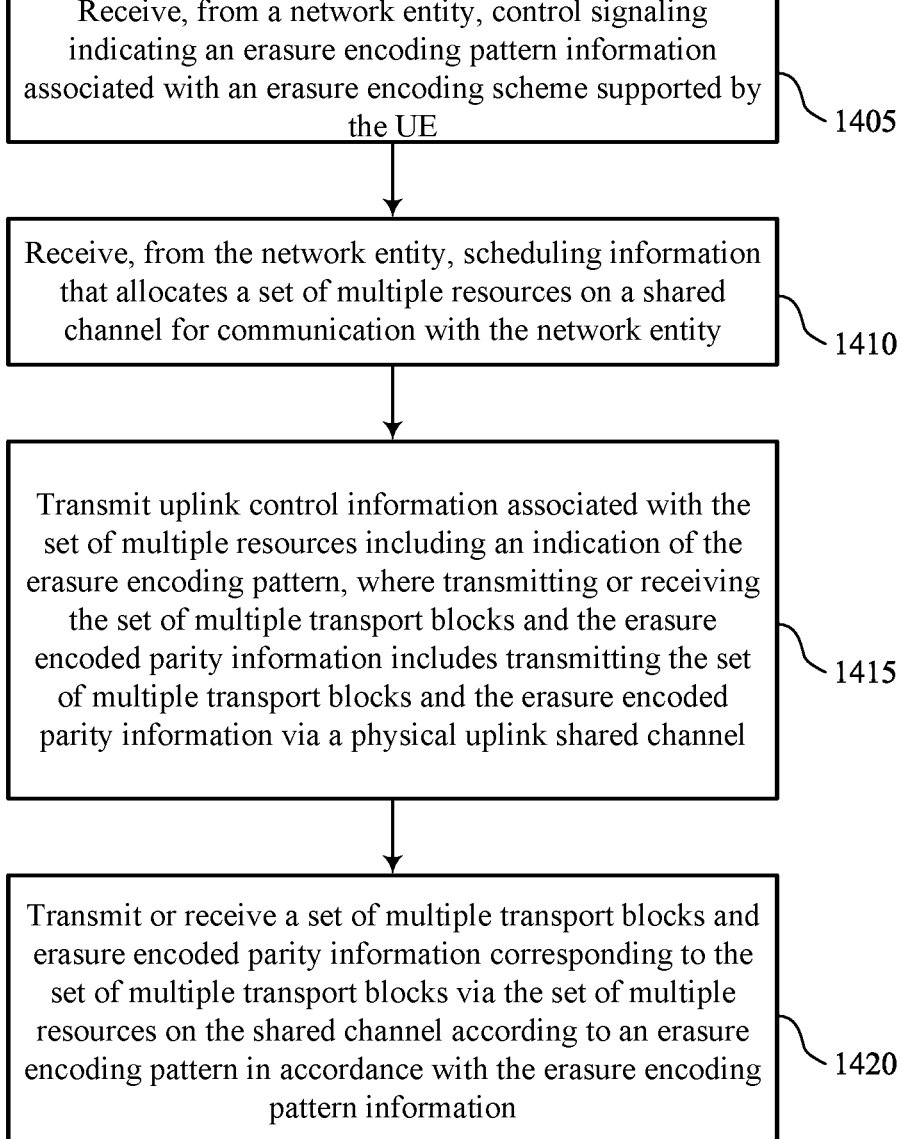

Receive, from a network entity, control signaling indicating an erasure encoding pattern information associated with an erasure encoding scheme supported by the UE ⎱1405

Receive, from the network entity, scheduling information that allocates a set of multiple resources on a shared channel for communication with the network entity ⎱1410

Transmit uplink control information associated with the set of multiple resources including an indication of the erasure encoding pattern, where transmitting or receiving the set of multiple transport blocks and the erasure encoded parity information includes transmitting the set of multiple transport blocks and the erasure encoded parity information via a physical uplink shared channel ⎱1415

Transmit or receive a set of multiple transport blocks and erasure encoded parity information corresponding to the set of multiple transport blocks via the set of multiple resources on the shared channel according to an erasure encoding pattern in accordance with the erasure encoding pattern information ⎱1420

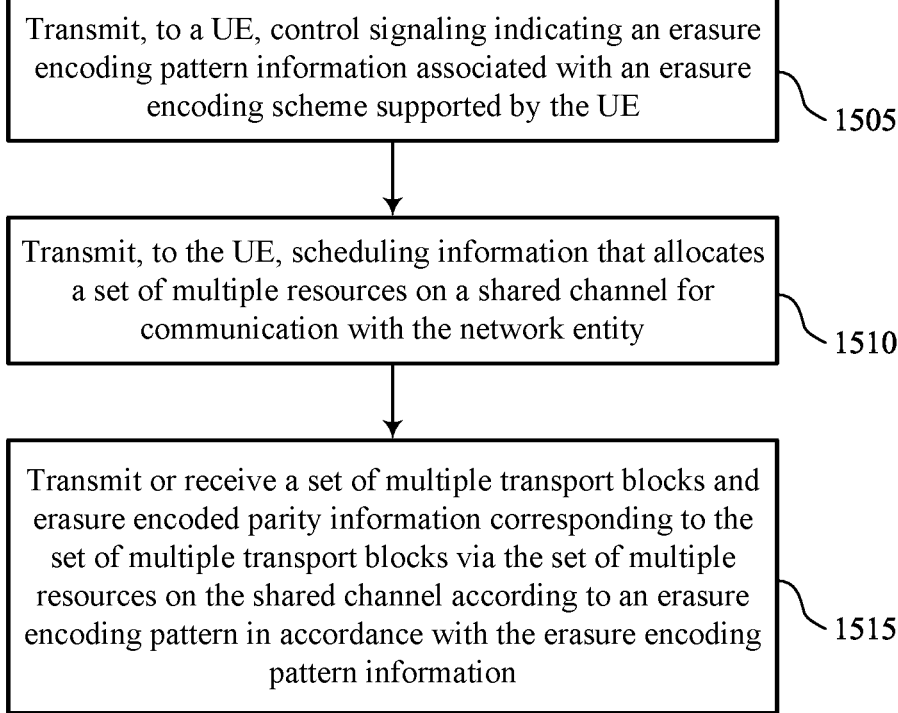

Transmit, to a UE, control signaling indicating an erasure encoding pattern information associated with an erasure encoding scheme supported by the UE    1505

Transmit, to the UE, scheduling information that allocates a set of multiple resources on a shared channel for communication with the network entity    1510

Transmit or receive a set of multiple transport blocks and erasure encoded parity information corresponding to the set of multiple transport blocks via the set of multiple resources on the shared channel according to an erasure encoding pattern in accordance with the erasure encoding pattern information    1515

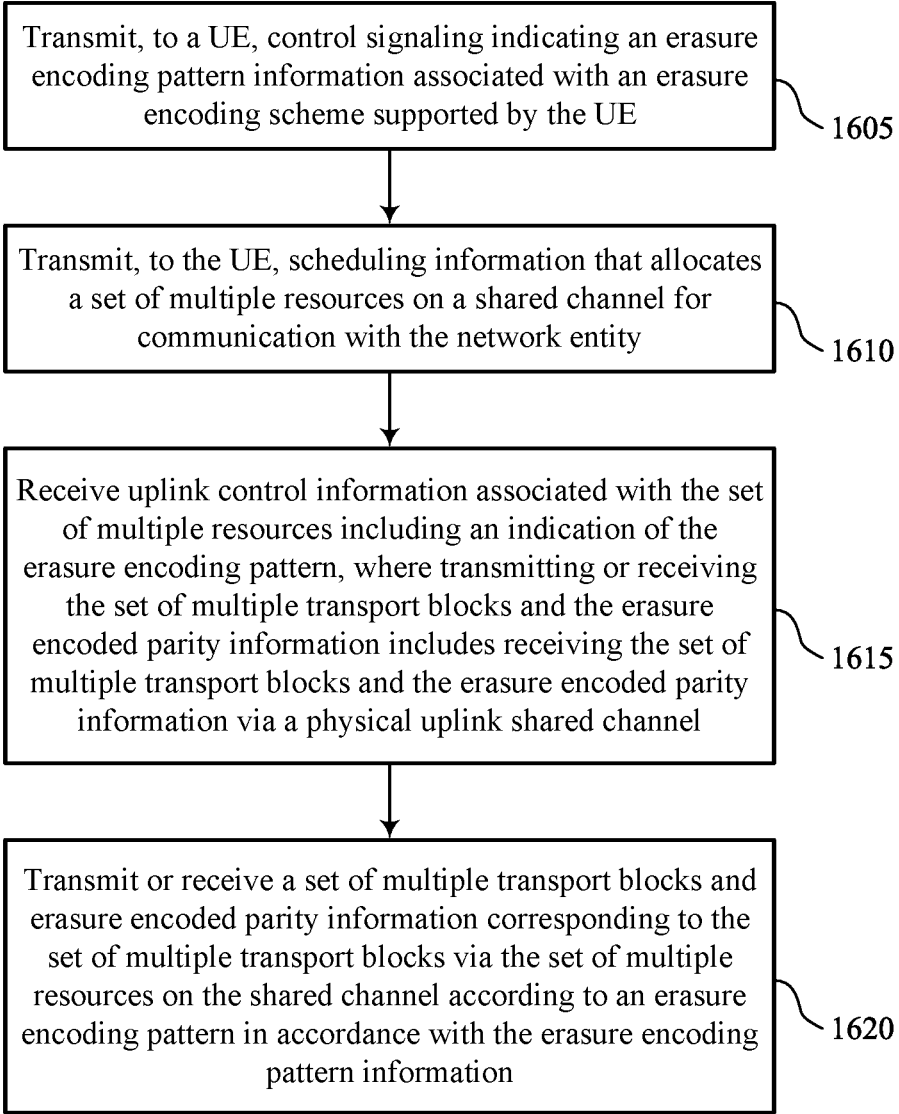

Transmit, to a UE, control signaling indicating an erasure encoding pattern information associated with an erasure encoding scheme supported by the UE

1605

Transmit, to the UE, scheduling information that allocates a set of multiple resources on a shared channel for communication with the network entity

1610

Receive uplink control information associated with the set of multiple resources including an indication of the erasure encoding pattern, where transmitting or receiving the set of multiple transport blocks and the erasure encoded parity information includes receiving the set of multiple transport blocks and the erasure encoded parity information via a physical uplink shared channel

1615

Transmit or receive a set of multiple transport blocks and erasure encoded parity information corresponding to the set of multiple transport blocks via the set of multiple resources on the shared channel according to an erasure encoding pattern in accordance with the erasure encoding pattern information

ADVANCED CODING FOR UPLINK AND DOWNLINK TRANSMISSIONS

FIELD OF TECHNOLOGY

The following relates to wireless communications, including advanced coding for uplink and downlink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support advanced coding for uplink and downlink transmissions. For example, the described techniques provide for effective erasure coding, including techniques for determining erasure encoding patterns. The method may provide for signaling for indicating, by a transmitting device, erasure encoding patterns to the receiving device, which may increase reliability of transmitted packet data units (PDUs) (e.g., reduce retransmissions). Erasure encoding patterns may define a location of encoded transmissions (e.g., a location of transmissions (e.g., one or more transport blocks) and a location of erasure encoded transmissions (e.g., corresponding to the transport blocks according to the erasure encoding as described herein), contents of encoded transmissions (e.g., erasure encoded combinations of specific transport blocks), or a combination thereof. A transmitting device may indicate the erasure encoding pattern to a receiving device via higher layer signaling (e.g., radio resource control (RRC) signaling, or a medium access control (MAC) control element (CE)), or dynamically (e.g., via downlink control information (DCI)), or via uplink control information (UCI) (e.g., in the case where a UE is the transmitting device and a network entity is a receiving device), or any combination thereof.

A method for wireless communications at a user equipment (UE) is described. The method may include receiving, from a network entity, control signaling indicating an erasure encoding pattern information associated with an erasure encoding scheme supported by the UE, receiving, from the network entity, scheduling information that allocates a set of multiple resources on a shared channel for communication with the network entity, and transmitting or receiving a set of multiple transport blocks and erasure encoded parity information corresponding to the set of multiple transport blocks via the set of multiple resources on the shared channel according to an erasure encoding pattern in accordance with the erasure encoding pattern information.

An apparatus for wireless communications at a UE is described. The apparatus may include a processor, memory coupled with the processor, and instructions stored in the memory. The instructions may be executable by the processor to cause the apparatus to receive, from a network entity, control signaling indicating an erasure encoding pattern information associated with an erasure encoding scheme supported by the UE, receive, from the network entity, scheduling information that allocates a set of multiple resources on a shared channel for communication with the network entity, and transmit or receive a set of multiple transport blocks and erasure encoded parity information corresponding to the set of multiple transport blocks via the set of multiple resources on the shared channel according to an erasure encoding pattern in accordance with the erasure encoding pattern information.

Another apparatus for wireless communications at a UE is described. The apparatus may include means for receiving, from a network entity, control signaling indicating an erasure encoding pattern information associated with an erasure encoding scheme supported by the UE, means for receiving, from the network entity, scheduling information that allocates a set of multiple resources on a shared channel for communication with the network entity, and means for transmitting or receiving a set of multiple transport blocks and erasure encoded parity information corresponding to the set of multiple transport blocks (TBs) via the set of multiple resources on the shared channel according to an erasure encoding pattern in accordance with the erasure encoding pattern information.

A non-transitory computer-readable medium storing code for wireless communications at a UE is described. The code may include instructions executable by a processor to receive, from a network entity, control signaling indicating an erasure encoding pattern information associated with an erasure encoding scheme supported by the UE, receive, from the network entity, scheduling information that allocates a set of multiple resources on a shared channel for communication with the network entity, and transmit or receive a set of multiple TBs and erasure encoded parity information corresponding to the set of multiple TBs via the set of multiple resources on the shared channel according to an erasure encoding pattern in accordance with the erasure encoding pattern information.

Some examples of the method, apparatuses, and non-transitory computer-readable medium described herein may further include operations, features, means, or instructions for receiving RRC signaling including the control signaling indicating the erasure encoding pattern information, the erasure encoding pattern information including a set of candidate erasure encoding patterns including the erasure encoding pattern and receiving a DCI message including the scheduling information and an indication of the erasure encoding pattern of the set of candidate erasure encoding pattern.

Some examples of the method, apparatuses, and non-transitory computer-readable medium described herein may further include operations, features, means, or instructions for receiving a DCI message including the control signaling indicating the erasure encoding pattern information and the scheduling information, the erasure encoding pattern information including an indication of the erasure encoding pattern.

In some examples of the method, apparatuses, and non-transitory computer-readable medium described herein, transmitting or receiving the set of multiple TBs and the erasure encoded parity information may include operations, features, means, or instructions for transmitting or receiving the set of multiple TBs via a first subset of the set of multiple resources prior to a threshold time according to the erasure encoding pattern and transmitting or receiving the erasure encoded parity information via a second subset of the set of multiple resources after the threshold time according to the erasure encoding pattern.

In some examples of the method, apparatuses, and non-transitory computer-readable medium described herein, the erasure encoding pattern information includes an indication of the threshold time.

In some examples of the method, apparatuses, and non-transitory computer-readable medium described herein, the threshold time may be defined with reference to a packet delay budget (PDB) corresponding to the set of multiple TBs.

In some examples of the method, apparatuses, and non-transitory computer-readable medium described herein, the threshold time may be defined with reference to a quantity of the first subset of the set of multiple resources, a quantity of the set of multiple TBs, or a combination thereof.

Some examples of the method, apparatuses, and non-transitory computer-readable medium described herein may further include operations, features, means, or instructions for transmitting UCI associated with the set of multiple resources including an indication of the erasure encoding pattern, where transmitting or receiving the set of multiple TBs and the erasure encoded parity information includes transmitting the set of multiple TBs and the erasure encoded parity information via a physical uplink shared channel.

Some examples of the method, apparatuses, and non-transitory computer-readable medium described herein may further include operations, features, means, or instructions for receiving, in the control signaling indicating the erasure encoding pattern information, an indication of a set of candidate erasure encoding patterns including the erasure encoding pattern and selecting the erasure encoding pattern from the set of candidate erasure encoding patterns, where transmitting the UCI may be based on the selecting.

Some examples of the method, apparatuses, and non-transitory computer-readable medium described herein may further include operations, features, means, or instructions for receiving, in the control signaling indicating the erasure encoding pattern information, an indication of a candidate erasure encoding pattern, where transmitting the UCI may be based on the indication of a candidate erasure encoding pattern.

In some examples of the method, apparatuses, and non-transitory computer-readable medium described herein, the erasure encoding pattern may be the same as the candidate erasure encoding pattern.

In some examples of the method, apparatuses, and non-transitory computer-readable medium described herein, the erasure encoding pattern may be different than the candidate erasure encoding pattern.

Some examples of the method, apparatuses, and non-transitory computer-readable medium described herein may further include operations, features, means, or instructions for receiving, in the erasure encoding pattern information, an indication the erasure encoding pattern, the erasure encoding pattern including a first subset of the set of multiple resources associated with the set of multiple TBs and a second subset of the set of multiple resources associated with the erasure encoded parity information.

Some examples of the method, apparatuses, and non-transitory computer-readable medium described herein may further include operations, features, means, or instructions for receiving, in the erasure encoding pattern information, an indication the erasure encoding pattern, the erasure encoding pattern including an encoder for generating the erasure encoded parity information according a combination of one or more TBs of the plurality TBs.

Some examples of the method, apparatuses, and non-transitory computer-readable medium described herein may further include operations, features, means, or instructions for receiving a DCI message including the scheduling information.

Some examples of the method, apparatuses, and non-transitory computer-readable medium described herein may further include operations, features, means, or instructions for receiving RRC signaling including configured grant (CG) uplink shared channel information, where the scheduling information includes a DCI message activating the set of multiple resources according to the CG uplink shared channel information.

In some examples of the method, apparatuses, and non-transitory computer-readable medium described herein, transmitting or receiving the set of multiple TBs and erasure encoded parity information may include operations, features, means, or instructions for transmitting the set of multiple TBs and erasure encoded parity information via an uplink shared channel according to the scheduling information.

In some examples of the method, apparatuses, and non-transitory computer-readable medium described herein, transmitting or receiving the set of multiple TBs and erasure encoded parity information may include operations, features, means, or instructions for receiving the set of multiple TBs and erasure encoded parity information via a downlink shared channel according to the scheduling information.

A method for wireless communications at a network entity is described. The method may include transmitting, to a UE, control signaling indicating an erasure encoding pattern information associated with an erasure encoding scheme supported by the UE, transmitting, to the UE, scheduling information that allocates a set of multiple resources on a shared channel for communication with the network entity, and transmitting or receiving a set of multiple TBs and erasure encoded parity information corresponding to the set of multiple TBs via the set of multiple resources on the shared channel according to an erasure encoding pattern in accordance with the erasure encoding pattern information.

An apparatus for wireless communications at a network entity is described. The apparatus may include a processor, memory coupled with the processor, and instructions stored in the memory. The instructions may be executable by the processor to cause the apparatus to transmit, to a UE, control signaling indicating an erasure encoding pattern information associated with an erasure encoding scheme supported by the UE, transmit, to the UE, scheduling information that allocates a set of multiple resources on a shared channel for communication with the network entity, and transmit or receive a set of multiple TBs and erasure encoded parity information corresponding to the set of multiple TBs via the set of multiple resources on the shared channel according to an erasure encoding pattern in accordance with the erasure encoding pattern information.

Another apparatus for wireless communications at a network entity is described. The apparatus may include means for transmitting, to a UE, control signaling indicating an erasure encoding pattern information associated with an erasure encoding scheme supported by the UE, means for transmitting, to the UE, scheduling information that allocates a set of multiple resources on a shared channel for communication with the network entity, and means for transmitting or receiving a set of multiple TBs and erasure encoded parity information corresponding to the set of multiple TBs via the set of multiple resources on the shared channel according to an erasure encoding pattern in accordance with the erasure encoding pattern information.

A non-transitory computer-readable medium storing code for wireless communications at a network entity is described. The code may include instructions executable by a processor to transmit, to a UE, control signaling indicating an erasure encoding pattern information associated with an erasure encoding scheme supported by the UE, transmit, to the UE, scheduling information that allocates a set of multiple resources on a shared channel for communication with the network entity, and transmit or receive a set of multiple TBs and erasure encoded parity information corresponding to the set of multiple TBs via the set of multiple resources on the shared channel according to an erasure encoding pattern in accordance with the erasure encoding pattern information.

Some examples of the method, apparatuses, and non-transitory computer-readable medium described herein may further include operations, features, means, or instructions for transmitting RRC signaling including the control signaling indicating the erasure encoding pattern information, the erasure encoding pattern information including a set of candidate erasure encoding patterns including the erasure encoding pattern and transmitting a DCI message including the scheduling information and an indication of the erasure encoding pattern of the set of candidate erasure encoding pattern.

Some examples of the method, apparatuses, and non-transitory computer-readable medium described herein may further include operations, features, means, or instructions for transmitting a DCI message including the control signaling indicating the erasure encoding pattern information and the scheduling information, the erasure encoding pattern information including an indication of the erasure encoding pattern.

In some examples of the method, apparatuses, and non-transitory computer-readable medium described herein, transmitting or receiving the set of multiple TBs and the erasure encoded parity information may include operations, features, means, or instructions for transmitting or receiving the set of multiple TBs via a first subset of the set of multiple resources prior to a threshold time according to the erasure encoding pattern and transmitting or receiving the erasure encoded parity information via a second subset of the set of multiple resources after the threshold time according to the erasure encoding pattern.

In some examples of the method, apparatuses, and non-transitory computer-readable medium described herein, the erasure encoding pattern information includes an indication of the threshold time.

In some examples of the method, apparatuses, and non-transitory computer-readable medium described herein, the threshold time may be defined with reference to a PDB corresponding to the set of multiple TBs.

In some examples of the method, apparatuses, and non-transitory computer-readable medium described herein, the threshold time may be defined with reference to a quantity of the first subset of the set of multiple resources, a quantity of the set of multiple TBs, or a combination thereof.

Some examples of the method, apparatuses, and non-transitory computer-readable medium described herein may further include operations, features, means, or instructions for receiving UCI associated with the set of multiple resources including an indication of the erasure encoding pattern, where transmitting or receiving the set of multiple TBs and the erasure encoded parity information includes receiving the set of multiple TBs and the erasure encoded parity information via a physical uplink shared channel.

Some examples of the method, apparatuses, and non-transitory computer-readable medium described herein may further include operations, features, means, or instructions for transmitting, in the erasure encoding pattern information, an indication the erasure encoding pattern, the erasure encoding pattern including an encoder for generating the erasure encoded parity information according a combination of one or more TBs of the plurality TBs.

In some examples of the method, apparatuses, and non-transitory computer-readable medium described herein, transmitting the scheduling information may include operations, features, means, or instructions for transmitting a DCI message or a RRC message including CG uplink shared channel information.

BRIEF DESCRIPTION OF THE DRAWINGS

FIGS. 13 through 16 illustrate flowcharts showing methods that support advanced coding for uplink and downlink transmissions in accordance with one or more aspects of the present disclosure.

DETAILED DESCRIPTION

Figure 1:
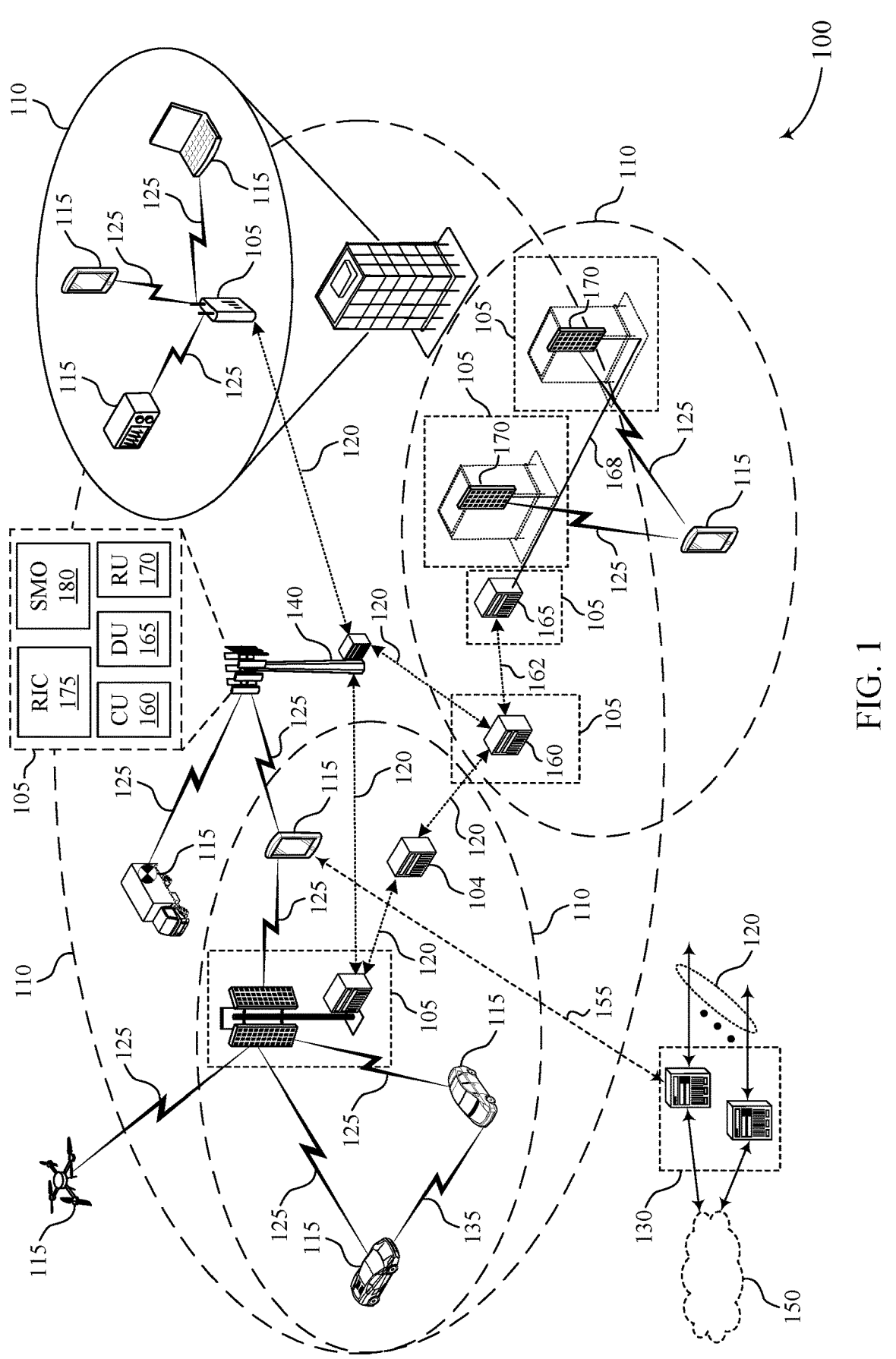
FIG. 1 illustrates an example of a wireless communications system that supports advanced coding for uplink and downlink transmissions in accordance with one or more aspects of the present disclosure.

Wireless communications may utilize various techniques for improving the reliability of wireless signaling. For example, wireless devices may employ erasure encoding procedures (e.g., where information is encoded according to parity check codes). A receiving device may implement parity check codes to correct one or more erasures (e.g., the receiving device can miss at least one transport block (TB), and recover the missed TB using the erasure codes). Thus, transmissions using erasure coding may result in increased overhead, while also increasing reliability.

In some examples, wireless signaling (e.g., low latency communications such as XR traffic) may include varying size of data transmissions (e.g., video frame size) and packet arrival according to a jitter. The jitter may affect the arrival time, and so a specified packet delay budget (PDB) may be defined for XR traffic. In some examples, the network may schedule a multiple physical downlink shared channel (multi-PDSCH) or multiple physical uplink shared channel (multi-PUSCH) transmission (e.g., a single downlink control information (DCI) scheduling multiple PDSCHs or multiple PUSCHs, or a configured grant (CG) scheduling one or more CG occasions including multiple PDSCHs or multiple PUSCHs). In some examples, for increased reliability (e.g., for XR traffic), a packet data unit (PDU) may be segmented into multiple packets or PDUs. Such PDUs may belong to a same PDU set, and may be transmitted via multiple CG occasions (e.g., via PDSCH or PUSCH), or multiple PUSCHs or multiple PDSCHs scheduled by a single DCI. However, after transmission of the sets of PDUs, there may not be enough time for a retransmission based on the pending PDB deadline.

In such examples, failed or missed transmissions (e.g., without time for retransmissions) may be missed entirely by the receiving device (e.g., resulting in failed communications, increased delays and system latency, inefficiency use of resources, etc.). Even if retransmission is possible, such retransmission may still result in increased system latency, or failure to satisfy threshold conditions for high priority communications. Encoded transmissions via such PDUs may enhance reliability and reduce the likelihood of a retransmission. However, if the receiving device is unaware of a location of, or configuration of, original transmissions (e.g., TBs) and a location or content of encoded transmissions (e.g., erasure encoding information), then the receiving device may not successfully decode the transmission.

Techniques described herein support effective erasure coding, including techniques for determining erasure encoding patterns. The method may provide for signaling for indicating erasure encoding patterns to the receiving device, which may increase reliability of transmitted PDUs (e.g., reduce retransmissions). Erasure encoding patterns may define a location of encoded transmissions (e.g., a location of unencoded transmissions and a location of encoded transmissions according to the erasure encoding), contents of encoded transmissions (e.g., erasure encoded parity information such as a combination of specific TBs according to an erasure code), or a combination thereof.

A single DCI may schedule multiple transmissions, or CG configuration information may schedule one or more CG occasions. In some examples, the scheduling DCI may schedule multiple PDSCH or PUSCH transmissions and may indicate an erasure encoding pattern of encoded transmissions. The patterns may be defined via higher layer signaling and indicated via the DCI, or may be defined and indicated in the scheduling DCI. In some examples, higher layer signaling (e.g., RRC signaling), or an activating DCI for a CG scenario, may define or indicate the erasure encoding pattern to be used in the scheduled PDSCH or PUSCH transmissions. In some examples, the encoded transmission may be implemented based on a timing threshold. For example, erasure encoded parity information may be located after a timing threshold defined with reference to an approaching PDB deadline, or after a quantity (e.g., number) of transmissions (e.g., the encoded transmission only occurs after a number of TBs or a number of slots). In some examples, such as if one or more resources of a CG occasion is not used, the skipped resources may be used to transmit erasure encoded parity information associated with one or more TBs transmitted in other resources of the CG occasion. For instance, for uplink transmission via a PUSCH, the UE may indicate an erasure encoding pattern (e.g., indicating a location of the erasure encoded parity information) via uplink control information (UCI). In some examples, the transmitting UE may select the indicated erasure encoding pattern based on a set of configured erasure encoding patterns, or based on control signaling enabling such autonomous selection.

Aspects of the disclosure are initially described in the context of wireless communications systems. Aspects of the disclosure are further illustrated by and described with reference to a wireless communications system, a timeline, and a process flow diagram. Aspects of the disclosure are further illustrated by and described with reference to apparatus diagrams, system diagrams, and flowcharts that relate to advanced coding for uplink and downlink transmissions.

FIG. 1 illustrates an example of a wireless communications system 100 that supports advanced coding for uplink and downlink transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support advanced coding for uplink and downlink transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The techniques described herein may provide for advanced coding for uplink and downlink transmissions. For example, the described techniques provide for effective erasure coding, including techniques for determining erasure encoding patterns. The method may provide for signaling for indicating erasure encoding patterns to the receiving device, which may increase reliability of transmitted PDUs (e.g., reduce retransmissions). Erasure encoding patterns may define a location of encoded transmissions (e.g., a location of unencoded transmissions and a location of encoded transmissions according to the erasure encoding), contents of encoded transmissions (e.g., erasure encoded parity information such as a combination of specific TBs according to an erasure code), or a combination thereof.

A single DCI may schedule multiple transmissions, or CG configuration information may schedule one or more CG occasions. In some examples, the scheduling DCI may schedule multiple PDSCH or PUSCH transmissions and may indicate an erasure encoding pattern of encoded transmissions. The patterns may be defined via higher layer signaling and indicated via the DCI, or may be defined and indicated in the scheduling DCI. In some examples, higher layer signaling (e.g., RRC signaling), or an activating DCI for a CG scenario, may define or indicate the erasure encoding pattern to be used in the scheduled PDSCH or PUSCH transmissions. In some examples, the encoded transmission may be implemented based on a timing threshold. For example, erasure encoded parity information may be located after a timing threshold defined with reference to an approaching PDB deadline, or after a quantity (e.g., number) of transmissions (e.g., the encoded transmission only occurs after a number of TBs or a number of slots). In some examples, such as if one or more resources of a CG occasion is not used, the skipped resources may be used to transmit erasure encoded parity information associated with one or more TBs transmitted in other resources of the CG occasion. For instance, for uplink transmission via a PUSCH, the UE 115 may indicate an erasure encoding pattern (e.g., indicating a location of the erasure encoded parity information via UCI. In some examples, the transmitting UE may select the indicated erasure encoding pattern based on a set of configured erasure encoding patterns, or based on control signaling enabling such autonomous selection.

Figure 2:
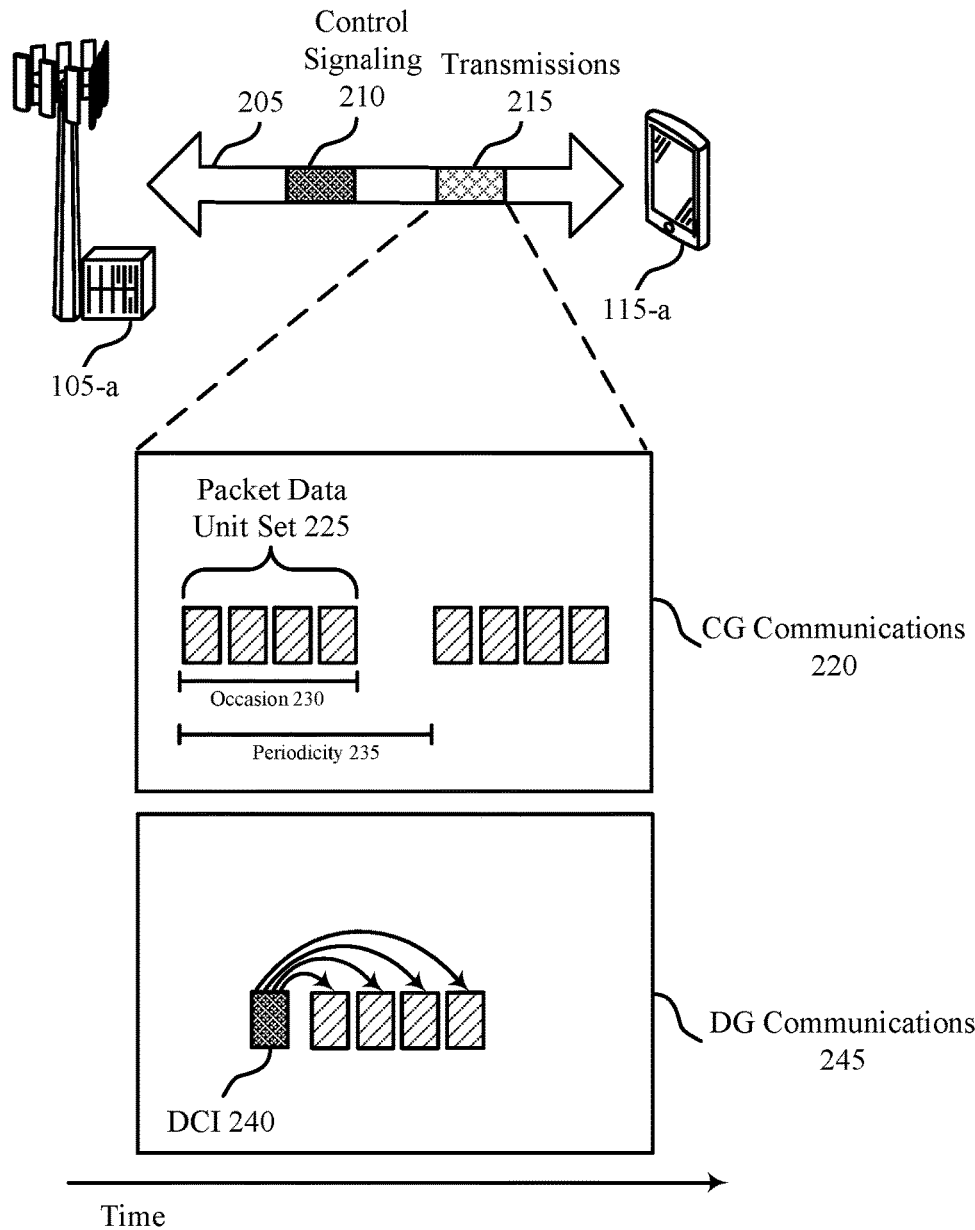
FIG. 2 illustrates an example of a wireless communications system that supports advanced coding for uplink and downlink transmissions in accordance with one or more aspects of the present disclosure.
Figure 2:

FIG. 2 illustrates an example of a wireless communications system 200 that supports advanced coding for uplink and downlink transmissions in accordance with one or more aspects of the present disclosure. In some examples, wireless communications system 200 may implement aspects of wireless communications system 100. The wireless communications system 200 may support various examples of erasure encoding pattern transmission techniques implemented at a UE 115-*a* and a network entity 105-*a*, which may be examples of a UE 115 and a network entity 105, respectively, as described with reference to FIG. 1. The UE 115-*a* may connect to and communicate with the network entity 105-*a* using a bidirectional communication link 205. The network entity 105-*a* and the UE 115-*a* may exchange control signaling 210 and transmissions 215 (e.g., data signaling via a PUSCH or PDSCH).

A transmitting device (e.g., a UE 115-*a* or a network entity 105-*a*) may perform erasure encoding procedures, which may support successful reception of transmissions even in the case of one or more erasures (e.g., portions of a transmission, such as one or more TBs that are missed by the receiver). For example, a transmitting device may perform erasure encoding on one or more TBs for transmission, and may transmit the TBs, and erasure encoded parity information corresponding to the TBs, as described herein. Erasure encoding may be referred to as erasure coding, among other examples. If one or more TBs (e.g., one or more PDUs of a PDU set) are missed by a receiving device (e.g., due to interference, obstructions, use cases, or any other scenario resulting in failed reception, detection, or decoding of one or more TBs), the receiving device may successfully receive (e.g., correct for) the erasure (e.g., may identify and successfully receive the erased or missed TB using the received TBs and the erasure encoded parity information).

In some examples, single parity check codes may correct one erasure. For example, an input for transmission (e.g., one or more TBs) may be represented as [a, b, c], which may be encoded to be [a, b, c, a⊕b⊕c] according to an erasure encoding procedure, and then transmitted. In some examples, the input [a, b, c] may represent one or more TBs for transmission, and aβb⊕c may represent parity encoded information corresponding to the TBs. In such examples, a piece of information (e.g., a, b, c) may be lost, or erased (e.g., the receiver may fail to receive the information due to interference, use case, transmitter error, receiver error, blockages, or obstructions, among other examples), and any singular erasure may be recovered. For example, the received vector may be described in Equation 1, where b is erased, and the erased element may be recovered by summing the other elements, as seen in Equation 2. Such cases may be viewed as a linear system (e.g., a Galois field), with three variables and four linearly independent constraints, as shown in Equation 3. In such examples, any three constraints (e.g., one erasure) are sufficient to find the three variables (e.g., it is possible to find a, b, or c if one of a, b, or c is erased).

$$[a \ ? \ c \ a \oplus b \oplus c] \tag{1}$$

$$a \oplus c \oplus (a \oplus b \oplus c) = b \tag{2}$$

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T \tag{3}$$

In some other examples, parity check codes may be used to address multiple (e.g., two) erasures. Correcting two or more erasures may be an extension of a single parity example (e.g., with reference to Equation 3). Equation 4 may support erasure encoding to recover from two erasures. In some examples, a maximum distance separable (MDS) code (e.g., a Reed-Solomon or other MDS code) may be used for such erasure encoding. In such examples, any k symbols of an n symbol codeword may be sufficient to decode the k information symbols. A receiving device may recover from up to two erasures, where an input of [a b c] (e.g., one or more TBs) may be encoded according to Equation 4 and transmitted (e.g., including erasure encoded parity information, such as a+b+c a+α·b+α²·c). Thus, by transmitting the erasure encoded transmission (e.g., the TBs, and the erasure encoded parity information corresponding to the TBs, such that the transmitted encoded vector includes [a b c a+b+c a+α·b+α²·c]T), transmissions performed using erasure coding may result in increased reliability.

$$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix} \cdot [a \ b \ c]^T = [a \ b \ c \ a+b+c \ a+\alpha \cdot b+\alpha^2 \cdot c]^T \tag{4}$$

Some examples, such as low latency communications (e.g., XR traffic), may include varying sizes of data transmissions (e.g., video frame size), as well as packet arrival according to a jitter. For instance, XR-related traffic may be quasi-periodic with low-latency and high-reliability thresholds to be satisfied. In some examples, periodical traffic of the application layer may arrive at the modem with jitters, affecting the arrival time (e.g., following Gaussian distribution of 0 mean, 2 ms STD, and arrange of [−4,4] ms). A specified PDB may be defined for XR traffic to account for the jitter affecting the arrival time. In some examples, the PDB may be limited. For example, for a given XR flow (e.g., XR flow B, uplink Head Pose), the PDB may be 1 ms. In another example, the PDB for the A flow of downlink Video may be 7 ms. Additionally, such as for uplink XR-related applications, transmissions may be frequent.

The control signaling 210 may schedule one or more transmissions 215 (e.g., which may be examples of XR, other low latency communications, or any other type of communication). In some examples, such as CG communications 220, the control signaling 210 may include higher layer signaling (e.g., RRC signaling) configuring one or more CG occasions 230 according to a periodicity 235. Each CG occasion 230 may include one or more shared channel resources 250 (e.g., PUSCHs or PDSCHs) for transmitting PDU sets 225. Each PDU set 225 may be divided into multiple IP packets or PDUs (e.g., at a lower layer). The PDUs may be scheduled across multiple shared channel resources 250 (e.g., multiple PDSCHs or PUSCHs). For example, the PDUs belonging to a same PDU set may be transmitted via multiple CG occasions 230, or via multiple PUSCH or PDSCH resources within a CG occasion 230. In some examples, such as the CG communications 220 the control signaling 210 may further include a DCI message activating one or more CG occasions 230.

If there is an error (e.g., an erasure) of one of the PDUs of a PDU set 225, there may not be enough time for the PDU to be retransmitted (e.g., before a PDB deadline for the PDU set 225). The transmissions 215 may be coded according to an erasure encoding pattern, which may result in increased reliability and may reduce the probability of retransmission. In some examples, such as the CG communications 220, the control signaling 210 may configure erasure encoding patterns. The transmitting device may be able to receive the transmissions 215 according to the control signaling 210, and recover any erased PDUs.

In some examples, such as dynamic grant (DG) communications 245, the DCI 240 may individually schedule one or more shared channel resources 250 (e.g., PUSCHs or PDSCHs for transmitting PDU sets 225). The wireless communications system 200 may support multi-PUSCH transmissions scheduled by the DCI 240 (e.g., or multi-PDSCH transmissions scheduled by the DCI 240). In some examples, such as the DG communications 245, the DCI 240 may be an example of the control signaling 210. In some examples, the DCI 240 may individually schedule one or more shared channel resources 250, which may reduce latency and save power. In such examples, multi-PUSCH or multi-PDSCH transmissions scheduled by the DCI 240 may not rely on transmission of a scheduling request and buffer status report for each TB, and the UE 115-a may not rely on blind decoding a control channel to decode a DCI message for each PUSCH transmission (e.g., which may result in reduced transmissions, lowering transmission latency and reducing power consumption for the UE 115-a).

In some examples, the DCI 240 may define and indicate an erasure encoding pattern of encoded transmissions. The erasure encoding patterns may define a location of TBs and erasure encoded parity information, contents of encoded transmissions (e.g., erasure encoded parity information based on or corresponding to the transmitted TBs), or a combination thereof. The transmission 215 may be transmitted according to the erasure encoding pattern defined and indicated by the DCI 240.

In some examples, the network entity 105-a may be the transmitting device, transmitting the control signaling 210 and transmitting the transmissions 215 to the UE 115-a via a PDSCH. In some examples, the UE 115-a may be the transmitting device, receiving the control signaling 210, and transmitting additional control signaling 210 (e.g., UCI) indicating a selected erasure encoding pattern, and transmitting the transmission 215 to the network entity 105-a via a PUSCH. Techniques described herein with reference to uplink signaling via a PUSCH may similarly be implemented for downlink signaling via a PDSCH (e.g., for single DCI scheduling) or multiple PDSCHs or semi-persistent scheduling (SPS) resources activated by a DCI message. The UE 115-a and the network entity 105-a may communicate according to erasure encoding patterns (e.g., and indicate erasure encoding patterns) to each other as described in greater detail with reference to FIGS. 3-4.

Figure 3:
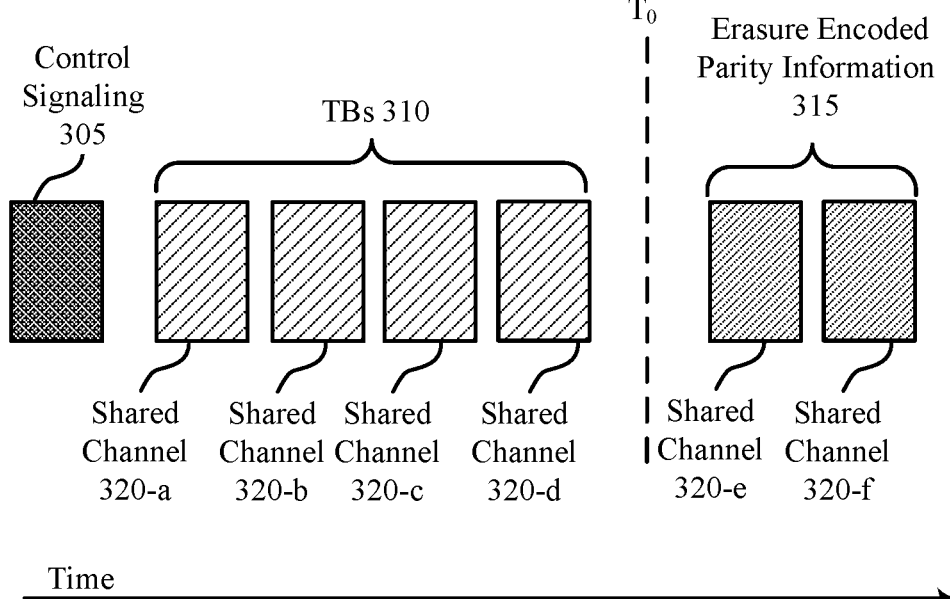
FIG. 3 illustrates an example of a timeline that supports advanced coding for uplink and downlink transmissions in accordance with one or more aspects of the present disclosure.

FIG. 3 illustrates an example of a timeline 300 that supports advanced coding for uplink and downlink transmissions in accordance with one or more aspects of the present disclosure. In some examples, the timeline 300 may implements aspects of the wireless communications system 200 and the wireless communications system 100. The timeline 300 may support various examples of erasure encoding pattern transmission techniques implemented at a UE 115 and a network entity 105 as described with reference to FIG. 1.

The control signaling 305 may schedule shared channels 320 (e.g., PDSCH resources or PUSCH resources on which to transmit one or more TBs 310 and erasure encoded parity information 315). The TBs 310 may be examples of XR, other low latency communications, or any other type of communication. In some examples, the control signaling 305 may include higher layer signaling (e.g., RRC signaling in a CG scenario) configuring one or more shared channels 320 (e.g., PUSCHs or PDSCHs) for transmitting the TBs 310 and erasure encoded parity information 315, or an activating DCI activating one or more CG occasions. In some other examples, the control signaling 305 may be a scheduling DCI scheduling shared channels 320 (e.g., multiple PUSCH resources or multiple PDSCH resources on which to transmit individual TBs 310 and erasure encoded parity information 315). The TBs 310 and the erasure encoded parity information 315 may be encoded according to an erasure encoding pattern, which may result in increased reliability and may reduce the probability of retransmission. For a receiving device to utilize erasure encoding to effectively retrieve missed information (e.g., one or more missed TBs), the transmitting device may indicate an erasure encoding pattern used for erasure encoding of a transmission.

In some other examples, the control signaling 305 may be a scheduling DCI scheduling shared channel 320-a (e.g., on a PUSCH or PDSCH). The DCI may include both the erasure encoding patterns and the scheduling information, or RRC signaling transmitted prior to the DCI may define a set of candidate erasure encoding patterns, and the DCI may indicate one of the defined candidate erasure encoding patterns. In some other examples, the TBs and erasure encoded parity information 315 may be scheduled by the same CG occasion and scheduling DCI (e.g., control signaling 305). The erasure encoding patterns may define a location of encoded transmissions (e.g., a location of unencoded transmissions and a location of encoded transmissions according to the erasure encoding), contents of encoded transmissions (e.g., a combination of specific TBs 310), or a combination thereof. For example, the erasure encoding pattern may indicate a location of TBs 310, and a location of erasure encoded parity information 315. For instance, a first erasure encoding pattern may be defined as follows: TB1, TB2, TB3, TB4, TB1+TB2+TB3, indicating that a set of TBs 310 may be transmitted via a first four slots (e.g., TB1 will be transmitted via shared channel 320-*a*, TB2 will be transmitted via shared channel 320-*b*, TB3 will be transmitted via shared channel 320-*c*, and TB4 will be transmitted via shared channel 320-*d*), and that erasure encoded parity information 315 via two subsequent slots (e.g., TB1+TB2+TB3 will be transmitted via the shared channel 320-*e* and the shared channel 320-*f*). The erasure encoding pattern may include any quantity (e.g., number) of TBs, and any order erasure encoded parity information (e.g., an erasure encoding pattern such as TB1, TB2, TB3, TB1+TB2, where the erasure encoded parity information 315 occurs subsequent to the first three TBs, an erasure encoding pattern of TB1, TB2, TB1+TB2, TB3, TB4, TB3+TB4, where the erasure encoded parity information 315 occurs every three slots or every three shared channels 320 (e.g., after each pair of TBs 310). In some examples, an indication of an erasure encoding pattern may include an indication of the contents of the erasure encoded parity information 315 (e.g., which TBs are combined, an equation for combining TBs 310, or the like). As described herein, erasure encoding patterns may be indicated via layer 1 (L1) signaling, layer 2 (L2) signaling, layer 3 (L3) signaling, or any combination thereof.

In some examples, the transmitting device may initiate coded transmissions (e.g., erasure encoded parity information 315) of part or all data (e.g., TBs 310) previously transmitted before a threshold time (e.g., $T_0$) (e.g., when a transmitting UE approaches a PDB deadline, or based on a threshold value). For example, the transmitting device may transmit the TBs 310. After a threshold time (e.g., after $T_0$) the transmitting device may initiate transmission of the erasure encoded parity information 315 (e.g., corresponding to some or all TBs 310 transmitted prior to $T_0$). The shared channels 320 may be associated with a same CG occasion, or may be scheduled by a same DCI. The threshold may be configured by the control signaling 305 (e.g., which may be RRC, DCI for a CG or a DG). For example, the threshold may be defined as a preconfigured number of TBs 310 or shared channels 320, and after the preconfigured number of scheduling TBs 310 are transmitted or after the preconfigured number of shared channels 320 are utilized for transmission of TBs 310, the transmitting device may transmit the erasure encoded parity information 315. In some examples, the threshold amount of time may be defined with reference to a PDB deadline (e.g., $T_0$ may occur the threshold amount of time prior to the PDB deadline). In some examples, the threshold may be defined such that $T_0$ occurs a number of slots after the first shared channel 320-*a*. In some examples, the transmitting device may automatically transmit the erasure encoded parity information 315 after the time $T_0$ has passed (e.g., after the configured time threshold).

In some examples, the network entity may be the transmitting device, transmitting the control signaling 305 and transmitting the TBs 310 prior to $T_0$ according to the threshold and transmitting the erasure encoded parity information 315 to the UE after $T_0$ according to the threshold (e.g., according to the erasure encoding pattern). In some other examples, the UE may by the transmitting device, receiving the control signaling 305 and transmitting TBs 310

(e.g., prior to $T_0$ and the erasure encoded parity information 315 after $T_0$) according to the erasure encoding pattern.

In some examples, the UE may transmit the TBs 310 and the erasure encoded parity information 315 to the network entity via the shared channels 320 (e.g., via resources on a PUSCH). In such examples, the UE 115 may transmit (e.g., via a UCI) an indication of an erasure encoding pattern to be used, and may then transmit the TBs 310 and the erasure encoded parity information 315 according to the indicated erasure encoding pattern. For example, the UE may use a skipped CG to send the erasure encoded parity information 315. For example, the control signaling 305 may include scheduling information for a CG, indicating one or more CG occasions. If the UE does not have data to transmit on one or more uplink CG occasions (e.g., on a PUSCH), then the CG occasion (e.g., including multiple shared channels 320) or one or more shared channels 320 of a CG), may be considered skipped. The control signaling 305 (e.g., a DCI message) may indicate the pattern for the UE to use to transmit (e.g., for example, skipped PUSCH resources may be available for retransmission, and a DCI message may be available for feedback signaling). The UE may use additional control signaling (e.g., a UCI, such as a CG-UCI) to indicate which erasure encoding pattern it will use, which may be different than the pattern indicated in the control signaling 305, or the same as the pattern indicted in the control signaling 305. In some examples, the control signaling 305 (e.g., CG configuration information, RRC signaling, a DCI, or any combination thereof) may indicate a set of candidate erasure encoding patterns, and the UE may indicate the erasure encoding pattern from candidate erasure encoding patterns via the UCI. In some examples, the used erasure encoded patter, or the sequence of what to transmit (e.g., a location of the TBs 310 and the erasure encoded parity information 315) may be indicated via L1, L2, or L3 signaling from the network entity to the UE, or may be part of CG configuration signaling.

Figure 4:
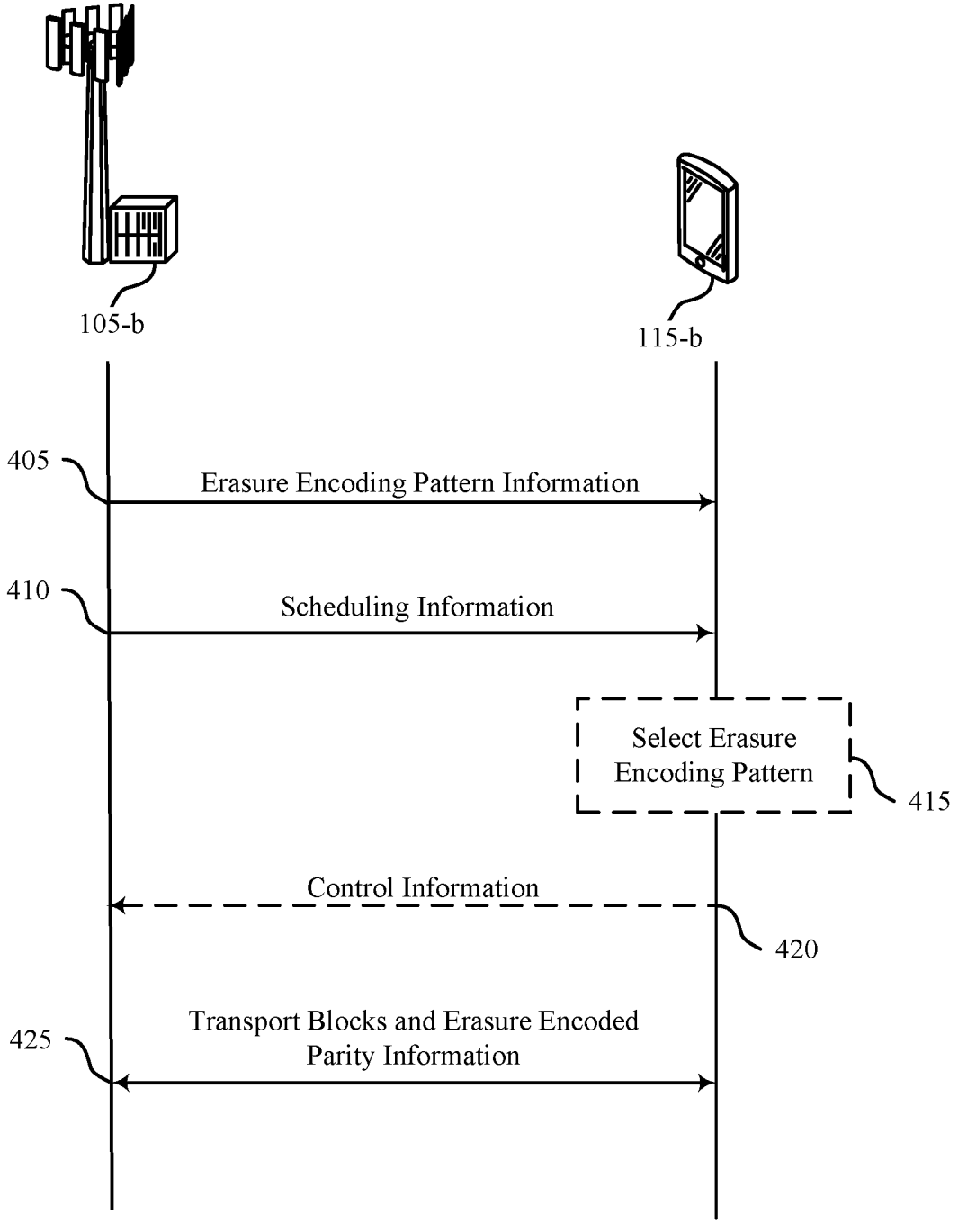
FIG. 4 illustrates an example of a process flow diagram that supports advanced coding for uplink and downlink transmissions in accordance with one or more aspects of the present disclosure.

FIG. 4 illustrates an example of a process flow diagram 400 that supports advanced coding for uplink and downlink transmissions in accordance with one or more aspects of the present disclosure. In some examples, the process flow diagram 400 may implement aspects of the timeline 300, the wireless communications system 200, and the wireless communications system 100. The process flow diagram 400 may support various examples of erasure encoding pattern transmission techniques implemented at a UE 115-*b* and a network entity 105-*b*, which may be examples of the UE 115 and the network entity 105, respectively, as described with reference to FIG. 1.

In the following description of the process flow diagram 400, the operations between the UE 115-*b* and the network entity 105-*b* may be performed in different orders or at different times. Some operations may also be left out of the process flow diagram 400, or other operations may be added. Although the UE 115-*b* and the network entity 105-*b* are shown performing the operations of the process flow diagram 400, some aspects of some operations may also be performed by one or more other wireless devices.

At 405, the UE 115-*b* may receive, from the network entity 105-*b*, control signaling indicating an erasure encoding pattern information associated with an erasure encoding scheme supported by the UE 115-*b*.

In some examples, the erasure encoding pattern information may include an indication of the erasure encoding pattern, the erasure encoding pattern including a first subset of the multiple resources associated with the multiple TBs and a second subset of the multiple resources associated with the erasure encoded parity information. In some examples, the erasure encoding pattern information may include an indication of the erasure encoding pattern, an encoder for generating the erasure encoded parity information according to a combination of one or more TBs of the multiple TBs, an equation on which to base the erasure encoded parity information or decode the erasure encoded parity information, among other examples.

At 410, the UE 115-*b* may receive, from the network entity 105-*b*, scheduling information that allocates a multiple resources on a shared channel for communication with the network entity 105-*b*.

At 425, the UE 115-*b* may transmit (e.g., via a PUSCH) or receive (e.g., via a PDSCH) multiple TBs and erasure encoded parity information corresponding to the multiple TBs via the multiple resources on the shared channel according to an erasure encoding pattern in accordance with the erasure encoding pattern information.

In some examples, the control signaling indicating an erasure encoding pattern information at 405 may be RRC signaling indicating the erasure encoding pattern information, and the erasure encoding pattern information may include a set of candidate erasure encoding patterns including the erasure encoding pattern. The scheduling information at 410 may be a DCI message including an indication of the erasure encoding pattern of the set of candidate erasure encoding pattern.

In some examples, the network entity 105-*b* may transmit the erasure encoding information (e.g., at 405) and the scheduling information (e.g., at 410) via the same message, such as a DCI message including the control signaling indicating the erasure encoding pattern information and the scheduling information.

In some examples, the multiple TBs may be transmitted or received via a first subset of the multiple resources prior to a threshold time according to the erasure encoding pattern, and the erasure encoded parity information may be transmitted or received via a second subset of the multiple resources after the threshold time according to the erasure encoding pattern. The erasure encoding pattern information may include an indication of the threshold time. The threshold time may be defined with reference to a PDB corresponding to the multiple TBs. The threshold time may be defined with reference to a quantity of the first subset of the multiple resources, a quantity of the multiple TBs, or a combination thereof.

In some examples, transmitting or receiving the multiple TBs and erasure encoded parity information includes receiving the multiple TBs and erasure encoded parity information via a downlink shared channel (e.g., a PDSCH) according to the scheduling information. In some examples, transmitting or receiving the plurality of TBs and erasure encoded parity information includes transmitting the multiple TBs and erasure encoded parity information via an uplink shared channel (e.g., a PUSCH) according to the scheduling information.

In some examples, at 405, the UE 115-*b* may receive, in the control signaling indicating the erasure encoding pattern information, an indication of a set of candidate erasure encoding patterns including the erasure encoding pattern. In such examples, at 415, the UE 115-*b* may select the erasure encoding pattern from the set of candidate erasure encoding patterns indicated at 405. In such examples, at 420, the UE 115-*b* may transmit UCI associated with the multiple resources (e.g., a CG UCI in the case of a CG configuration received at 410) including an indication of the erasure encoding pattern selected at 415 (e.g., from the set of candidate erasure encoding patterns). In some examples, transmitting the UCI (e.g., including the indication of the erasure encoding pattern) may be based on an explicit indication of a candidate erasure encoding pattern (e.g., indicated by the network entity 105-*b* at 405). In some examples, the erasure encoding pattern may be the same as the candidate erasure encoding pattern. In some other examples, the erasure encoding pattern may be different than the candidate erasure encoding pattern. At 425, the UE 115-*b* may transmit the multiple TBs and the erasure encoded parity information via the PUSCH (e.g., according to the erasure encoding pattern indicated via the UCI transmitted at 420.

Figure 5:
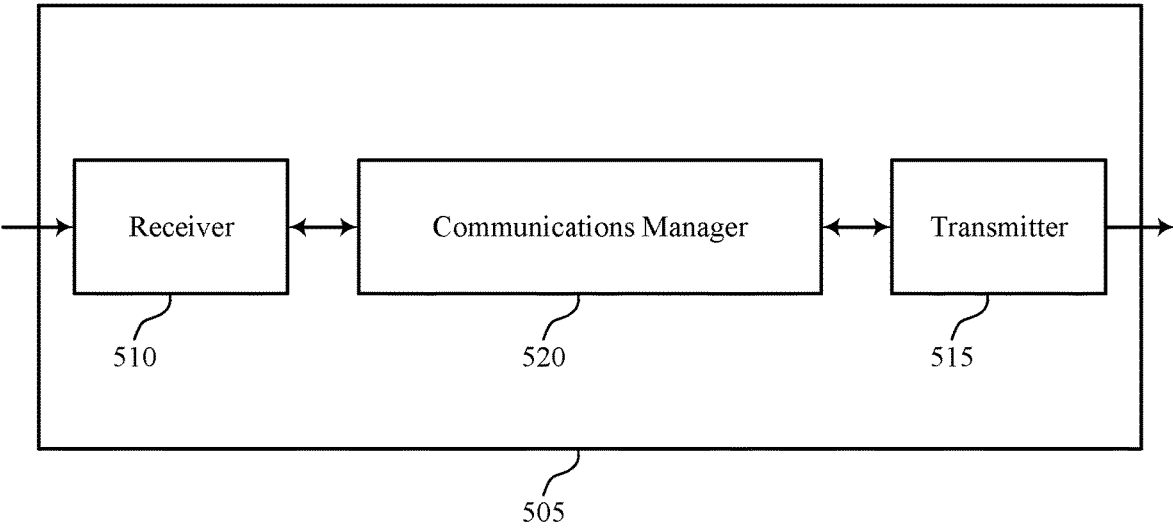
FIGS. 5 and 6 illustrate block diagrams of devices that support advanced coding for uplink and downlink transmissions in accordance with one or more aspects of the present disclosure.

FIG. 5 illustrates a block diagram 500 of a device 505 that supports advanced coding for uplink and downlink transmissions in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to advanced coding for uplink and downlink transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to advanced coding for uplink and downlink transmissions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of advanced coding for uplink and downlink transmissions as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving, from a network entity, control signaling indicating an erasure encoding pattern information associated with an erasure encoding scheme supported by the UE. The communications manager 520 may be configured as or otherwise support a means for receiving, from the network entity, scheduling information that allocates a set of multiple resources on a shared channel for communication with the network entity. The communications manager 520 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for advanced coding for uplink and downlink transmissions, which may result in reduced processing, reduced power consumption, or more efficient utilization of communication resources, among other advantages.

Figure 6:
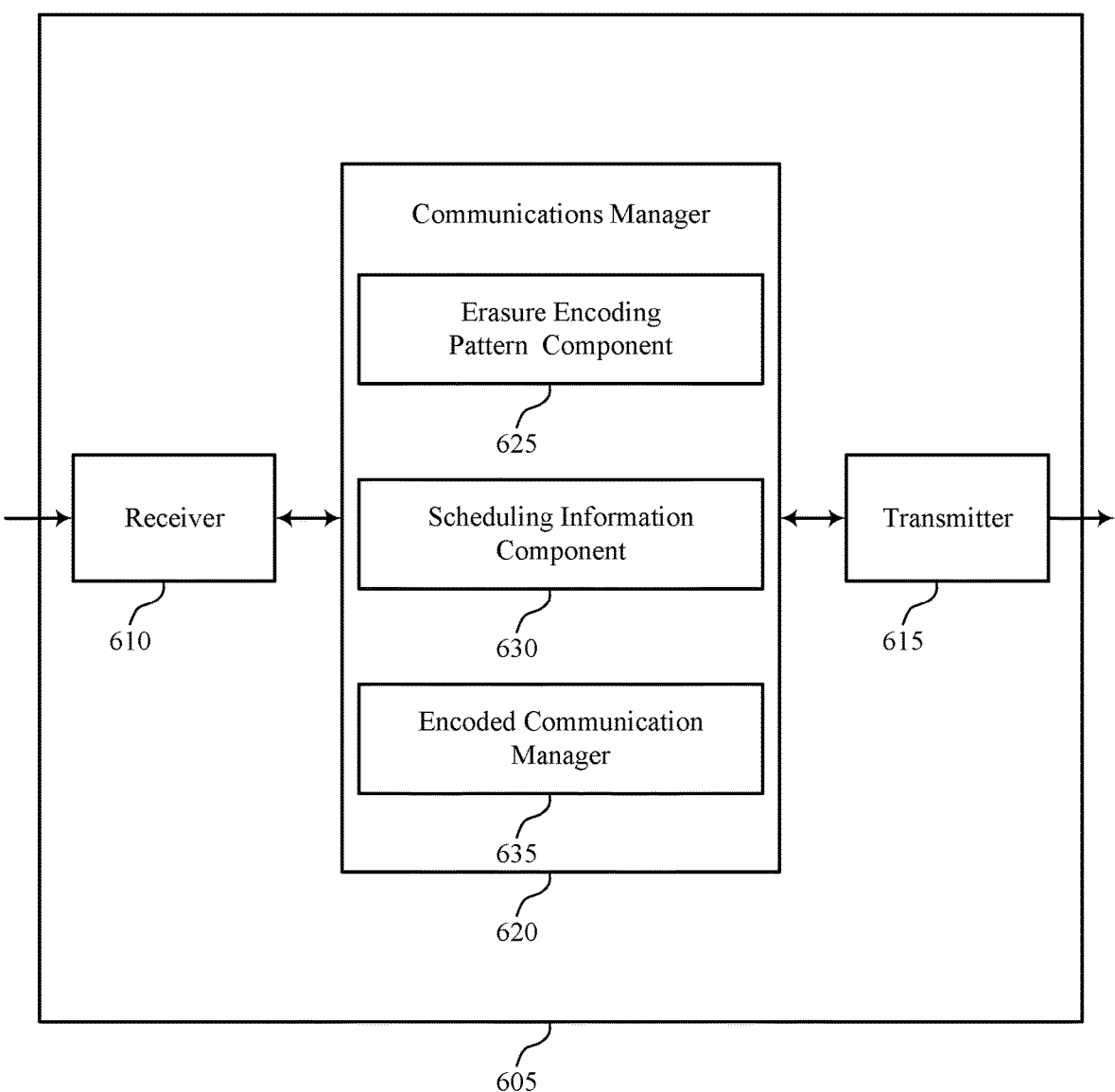

FIG. 6 illustrates a block diagram 600 of a device 605 that supports advanced coding for uplink and downlink transmissions in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to advanced coding for uplink and downlink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to advanced coding for uplink and downlink transmissions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of advanced coding for uplink and downlink transmissions as described herein. For example, the communications manager 620 may include an erasure encoding pattern component 625, a scheduling information component 630, an encoded communication manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The erasure encoding pattern component 625 may be configured as or otherwise support a means for receiving, from a network entity, control signaling indicating an erasure encoding pattern information associated with an erasure encoding scheme supported by the UE. The scheduling information component 630 may be configured as or otherwise support a means for receiving, from the network entity, scheduling information that allocates a set of multiple resources on a shared channel for communication with the network entity. The encoded communication manager 635 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

Figure 7:
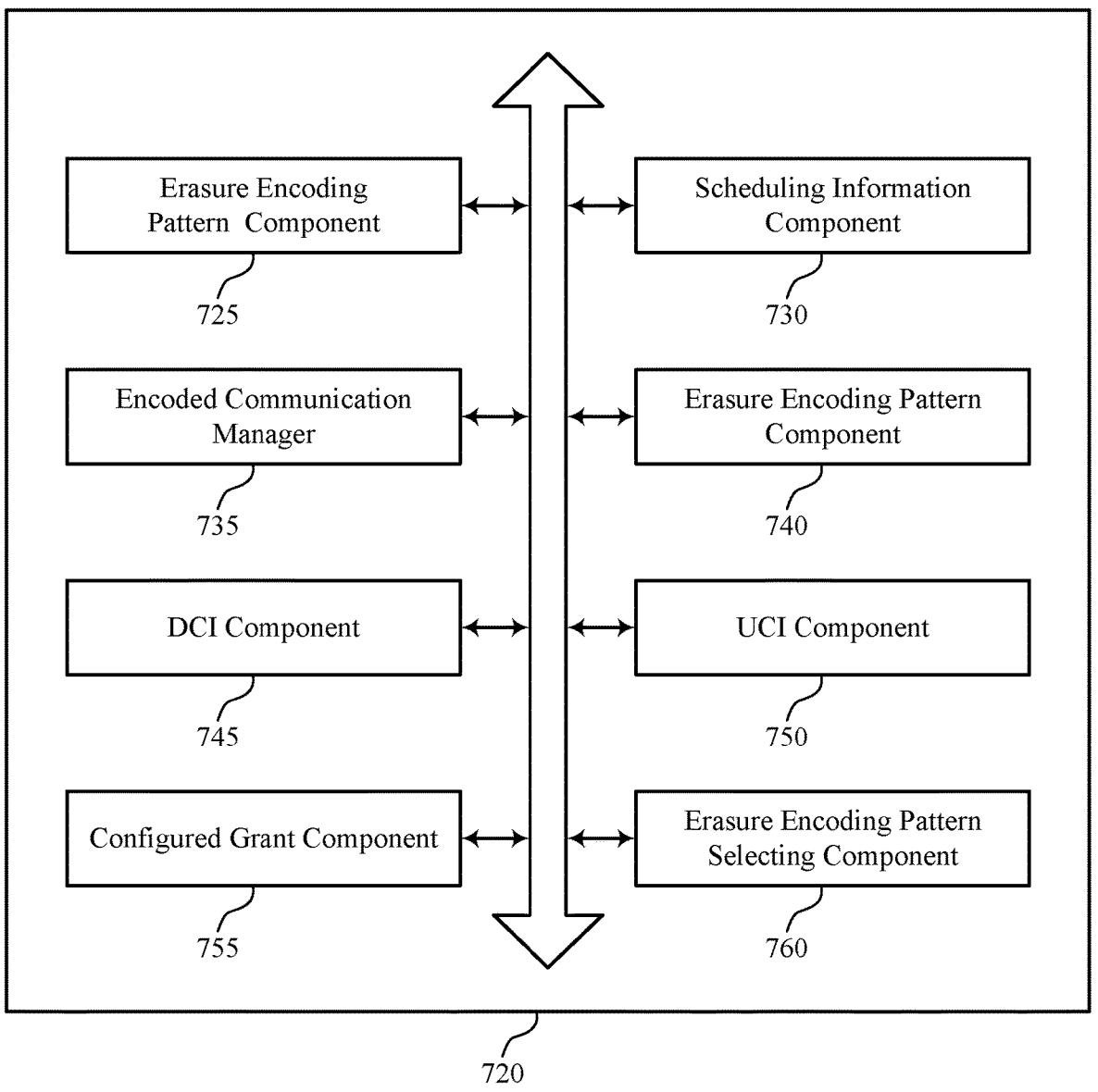
FIG. 7 illustrates a block diagram of a communications manager that supports advanced coding for uplink and downlink transmissions in accordance with one or more aspects of the present disclosure.

FIG. 7 illustrates a block diagram 700 of a communications manager 720 that supports advanced coding for uplink and downlink transmissions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of advanced coding for uplink and downlink transmissions as described herein. For example, the communications manager 720 may include an erasure encoding pattern component 725, a scheduling information component 730, an encoded communication manager 735, an erasure encoding pattern component 740, a DCI component 745, a UCI component 750, a CG component 755, an erasure encoding pattern selecting component 760, or any combination thereof. Each of these components may communicate, directly or indirectly, with one another (e.g., via one or more buses).

The communications manager 720 may support wireless communications at a UE in accordance with examples as disclosed herein. The erasure encoding pattern component 725 may be configured as or otherwise support a means for receiving, from a network entity, control signaling indicating an erasure encoding pattern information associated with an erasure encoding scheme supported by the UE. The scheduling information component 730 may be configured as or otherwise support a means for receiving, from the network entity, scheduling information that allocates a set of multiple resources on a shared channel for communication with the network entity. The encoded communication manager 735 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

In some examples, the erasure encoding pattern component 740 may be configured as or otherwise support a means for receiving RRC signaling including the control signaling indicating the erasure encoding pattern information, the erasure encoding pattern information including a set of candidate erasure encoding patterns including the erasure encoding pattern. In some examples, the DCI component 745 may be configured as or otherwise support a means for receiving a DCI message including the scheduling information and an indication of the erasure encoding pattern of the set of candidate erasure encoding pattern.

In some examples, the DCI component 745 may be configured as or otherwise support a means for receiving a DCI message including the control signaling indicating the erasure encoding pattern information and the scheduling information, the erasure encoding pattern information including an indication of the erasure encoding pattern.

In some examples, to support transmitting or receiving the set of multiple TBs and the erasure encoded parity information, the encoded communication manager 735 may be configured as or otherwise support a means for transmitting or receiving the set of multiple TBs via a first subset of the set of multiple resources prior to a threshold time according to the erasure encoding pattern. In some examples, to support transmitting or receiving the set of multiple TBs and the erasure encoded parity information, the encoded communication manager 735 may be configured as or otherwise support a means for transmitting or receiving the erasure encoded parity information via a second subset of the set of multiple resources after the threshold time according to the erasure encoding pattern.

In some examples, the erasure encoding pattern information includes an indication of the threshold time.

In some examples, the threshold time is defined with reference to a PDB corresponding to the set of multiple TBs.

In some examples, the threshold time is defined with reference to a quantity of the first subset of the set of multiple resources, a quantity of the set of multiple TBs, or a combination thereof.

In some examples, the UCI component 750 may be configured as or otherwise support a means for transmitting UCI associated with the set of multiple resources including an indication of the erasure encoding pattern, where transmitting or receiving the set of multiple TBs and the erasure encoded parity information includes transmitting the set of multiple TBs and the erasure encoded parity information via a physical uplink shared channel.

In some examples, the erasure encoding pattern component 740 may be configured as or otherwise support a means for receiving, in the control signaling indicating the erasure encoding pattern information, an indication of a set of candidate erasure encoding patterns including the erasure encoding pattern. In some examples, the erasure encoding pattern selecting component 760 may be configured as or otherwise support a means for selecting the erasure encoding pattern from the set of candidate erasure encoding patterns, where transmitting the UCI is based on the selecting.

In some examples, the erasure encoding pattern component 740 may be configured as or otherwise support a means for receiving, in the control signaling indicating the erasure encoding pattern information, an indication of a candidate erasure encoding pattern, where transmitting the UCI is based on the indication of a candidate erasure encoding pattern.

In some examples, the erasure encoding pattern is the same as the candidate erasure encoding pattern.

In some examples, the erasure encoding pattern is different than the candidate erasure encoding pattern.

In some examples, the erasure encoding pattern component 740 may be configured as or otherwise support a means for receiving, in the erasure encoding pattern information, an indication the erasure encoding pattern, the erasure encoding pattern including a first subset of the set of multiple resources associated with the set of multiple TBs and a second subset of the set of multiple resources associated with the erasure encoded parity information.

In some examples, the erasure encoding pattern component 740 may be configured as or otherwise support a means for receiving, in the erasure encoding pattern information, an indication the erasure encoding pattern, the erasure encoding pattern including an encoder for generating the erasure encoded parity information according a combination of one or more TBs of the plurality TBs.

In some examples, the scheduling information component 730 may be configured as or otherwise support a means for receiving a DCI message including the scheduling information.

In some examples, the CG component 755 may be configured as or otherwise support a means for receiving RRC signaling including CG uplink shared channel information, where the scheduling information includes a DCI message activating the set of multiple resources according to the CG uplink shared channel information.

In some examples, to support transmitting or receiving the set of multiple TBs and erasure encoded parity information, the encoded communication manager 735 may be configured as or otherwise support a means for transmitting the set of multiple TBs and erasure encoded parity information via an uplink shared channel according to the scheduling information.

In some examples, to support transmitting or receiving the set of multiple TBs and erasure encoded parity information, the encoded communication manager 735 may be configured as or otherwise support a means for receiving the set of multiple TBs and erasure encoded parity information via a downlink shared channel according to the scheduling information.

Figure 8:
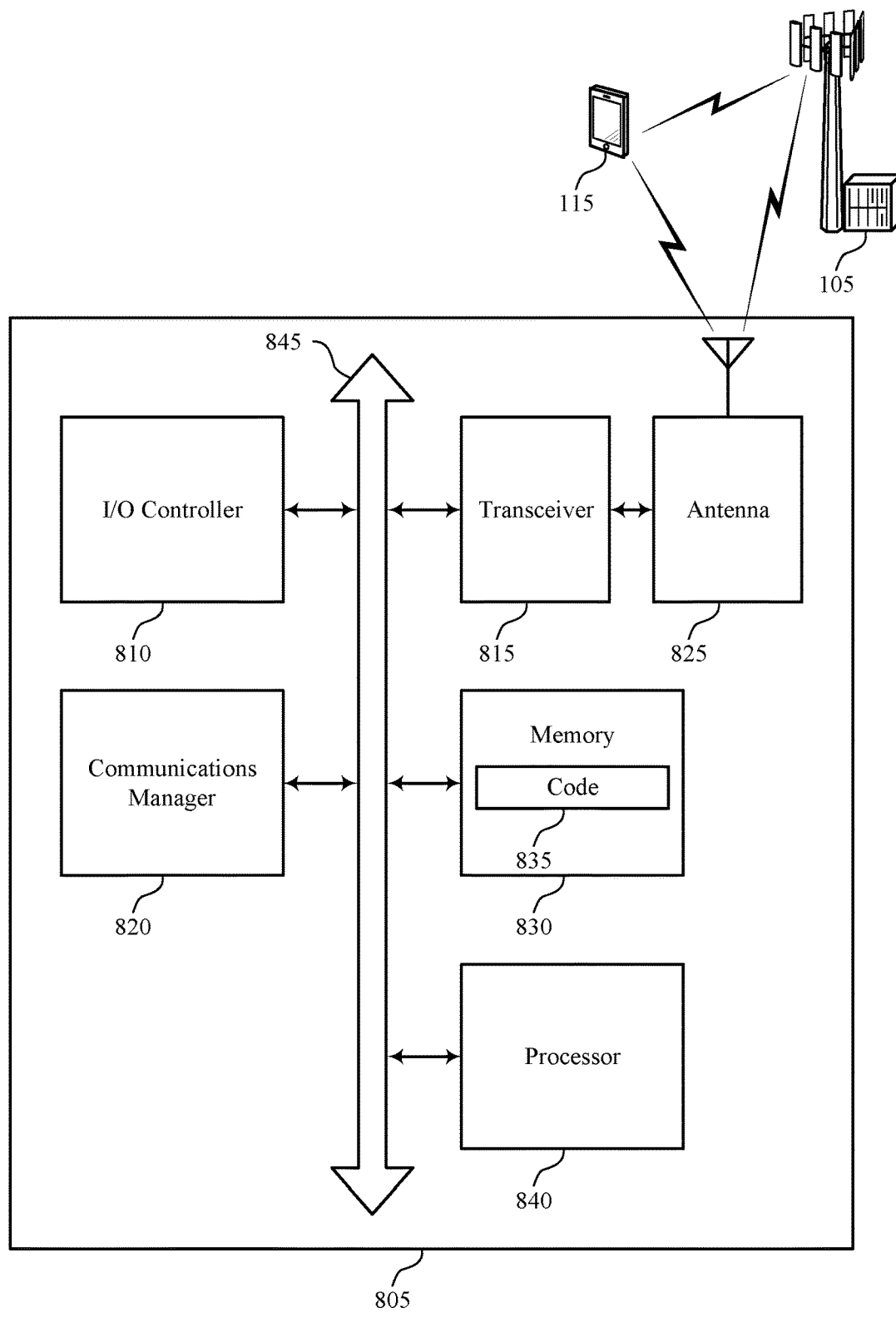
FIG. 8 illustrates a diagram of a system including a device that supports advanced coding for uplink and downlink transmissions in accordance with one or more aspects of the present disclosure.

FIG. 8 illustrates a diagram of a system 800 including a device 805 that supports advanced coding for uplink and downlink transmissions in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting advanced coding for uplink and downlink transmissions). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a network entity, control signaling indicating an erasure encoding pattern information associated with an erasure encoding scheme supported by the UE. The communications manager 820 may be configured as or otherwise support a means for receiving, from the network entity, scheduling information that allocates a set of multiple resources on a shared channel for communication with the network entity. The communications manager 820 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

By including or configuring the communications manager 820 in accordance with examples as described herein, the device 805 may support techniques for advanced coding for uplink and downlink transmissions, which may result in improved communication reliability, reduced latency, improved user experience related to reduced processing, reduced power consumption, more efficient utilization of communication resources, improved coordination between devices, longer battery life, or improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of advanced coding for uplink and downlink transmissions as described herein, or the processor 840 and the memory 830 may be otherwise configured to perform or support such operations.

Figure 9:
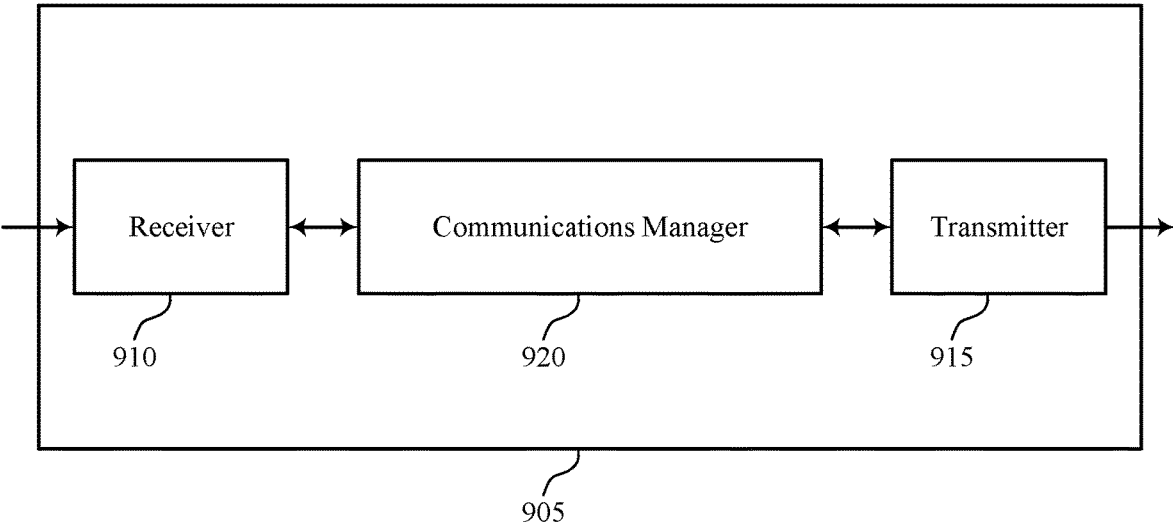
FIGS. 9 and 10 illustrate block diagrams of devices that support advanced coding for uplink and downlink transmissions in accordance with one or more aspects of the present disclosure.

FIG. 9 illustrates a block diagram 900 of a device 905 that supports advanced coding for uplink and downlink transmissions in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of advanced coding for uplink and downlink transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting, to a UE, control signaling indicating an erasure encoding pattern information associated with an erasure encoding scheme supported by the UE. The communications manager 920 may be configured as or otherwise support a means for transmitting, to the UE, scheduling information that allocates a set of multiple resources on a shared channel for communication with the network entity. The communications manager 920 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for advanced coding for uplink and downlink transmissions, which may result in reduced processing, reduced power consumption, more efficient utilization of communication resources, or other advantages.

Figure 10:
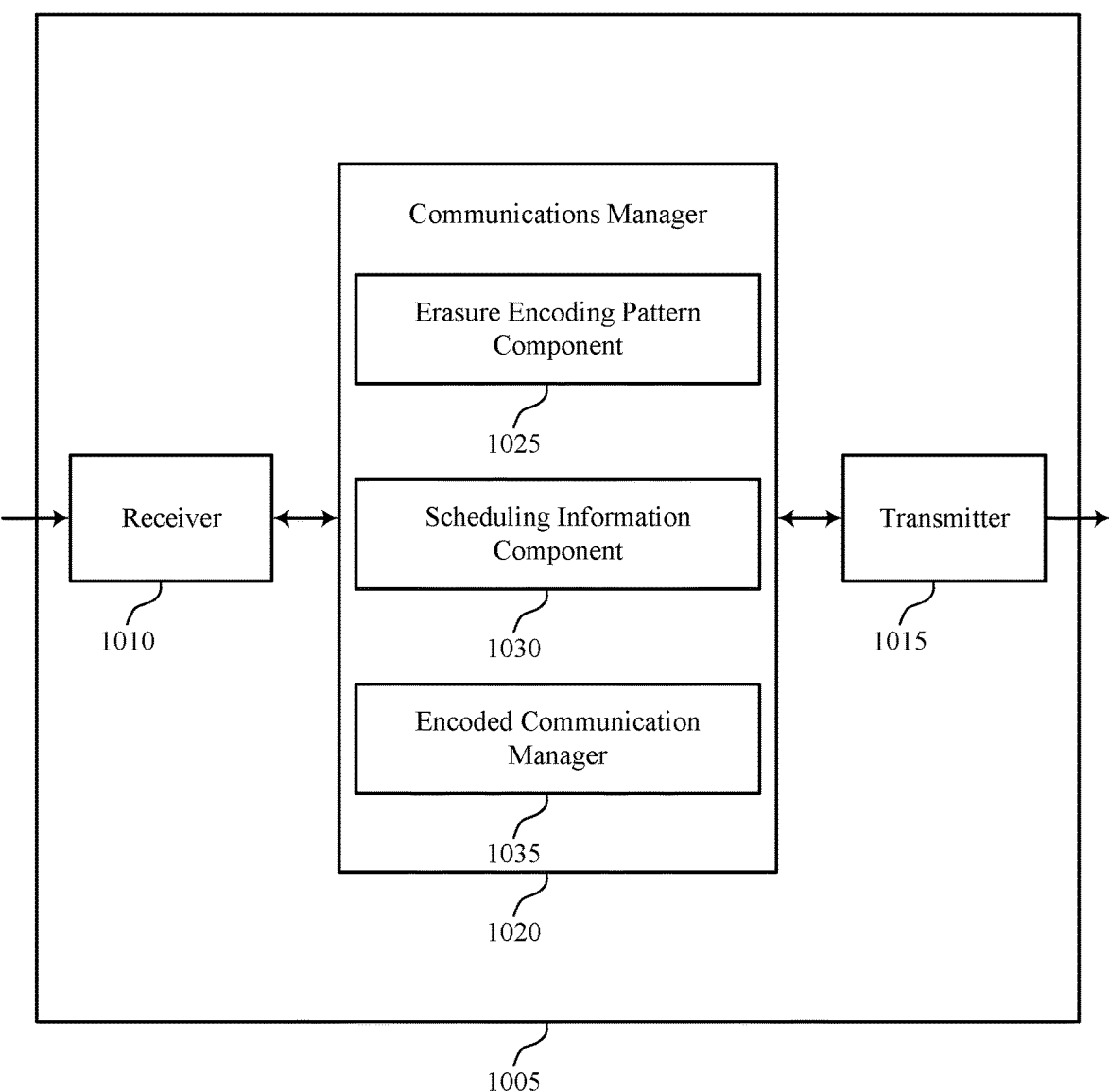

FIG. 10 illustrates a block diagram 1000 of a device 1005 that supports advanced coding for uplink and downlink transmissions in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of advanced coding for uplink and downlink transmissions as described herein. For example, the communications manager 1020 may include an erasure encoding pattern component 1025, a scheduling information component 1030, an encoded communication manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The erasure encoding pattern component 1025 may be configured as or otherwise support a means for transmitting, to a UE, control signaling indicating an erasure encoding pattern information associated with an erasure encoding scheme supported by the UE. The scheduling information component 1030 may be configured as or otherwise support a means for transmitting, to the UE, scheduling information that allocates a set of multiple resources on a shared channel for communication with the network entity. The encoded communication manager 1035 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

Figure 11:
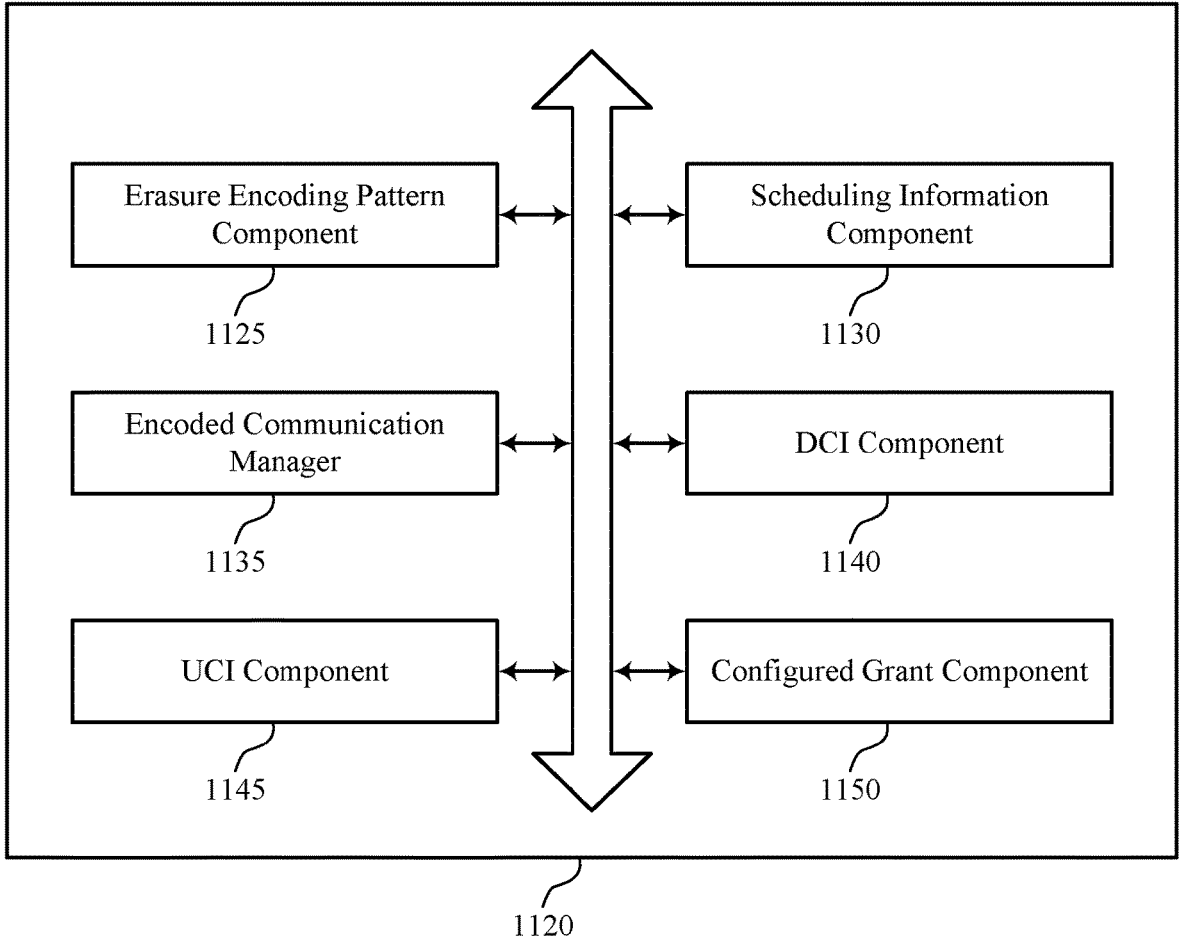
FIG. 11 illustrates a block diagram of a communications manager that supports advanced coding for uplink and downlink transmissions in accordance with one or more aspects of the present disclosure.

FIG. 11 illustrates a block diagram 1100 of a communications manager 1120 that supports advanced coding for uplink and downlink transmissions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of advanced coding for uplink and downlink transmissions as described herein. For example, the communications manager 1120 may include an erasure encoding pattern component 1125, a scheduling information component 1130, an encoded communication manager 1135, a DCI component 1140, a UCI component 1145, a CG component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The erasure encoding pattern component 1125 may be configured as or otherwise support a means for transmitting, to a UE, control signaling indicating an erasure encoding pattern information associated with an erasure encoding scheme supported by the UE. The scheduling information component 1130 may be configured as or otherwise support a means for transmitting, to the UE, scheduling information that allocates a set of multiple resources on a shared channel for communication with the network entity. The encoded communication manager 1135 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

In some examples, the erasure encoding pattern component 1125 may be configured as or otherwise support a means for transmitting RRC signaling including the control signaling indicating the erasure encoding pattern information, the erasure encoding pattern information including a set of candidate erasure encoding patterns including the erasure encoding pattern. In some examples, the DCI component 1140 may be configured as or otherwise support a means for transmitting a DCI message including the scheduling information and an indication of the erasure encoding pattern of the set of candidate erasure encoding pattern.

In some examples, the DCI component 1140 may be configured as or otherwise support a means for transmitting a DCI message including the control signaling indicating the erasure encoding pattern information and the scheduling information, the erasure encoding pattern information including an indication of the erasure encoding pattern.

In some examples, to support transmitting or receiving the set of multiple TBs and the erasure encoded parity information, the encoded communication manager 1135 may be configured as or otherwise support a means for transmitting or receiving the set of multiple TBs via a first subset of the set of multiple resources prior to a threshold time according to the erasure encoding pattern. In some examples, to support transmitting or receiving the set of multiple TBs and the erasure encoded parity information, the encoded communication manager 1135 may be configured as or otherwise support a means for transmitting or receiving the erasure encoded parity information via a second subset of the set of multiple resources after the threshold time according to the erasure encoding pattern.

In some examples, the erasure encoding pattern information includes an indication of the threshold time.

In some examples, the threshold time is defined with reference to a PDB corresponding to the set of multiple TBs.

In some examples, the threshold time is defined with reference to a quantity of the first subset of the set of multiple resources, a quantity of the set of multiple TBs, or a combination thereof.

In some examples, the UCI component 1145 may be configured as or otherwise support a means for receiving UCI associated with the set of multiple resources including an indication of the erasure encoding pattern, where transmitting or receiving the set of multiple TBs and the erasure encoded parity information includes receiving the set of multiple TBs and the erasure encoded parity information via a physical uplink shared channel.

In some examples, the erasure encoding pattern component 1125 may be configured as or otherwise support a means for transmitting, in the erasure encoding pattern information, an indication the erasure encoding pattern, the erasure encoding pattern including an encoder for generating the erasure encoded parity information according a combination of one or more TBs of the plurality TBs.

In some examples, to support transmitting the scheduling information, the CG component 1150 may be configured as or otherwise support a means for transmitting a DCI message or a RRC message including CG uplink shared channel information.

Figure 12:
FIG. 12 illustrates a diagram of a system including a device that supports advanced coding for uplink and downlink transmissions in accordance with one or more aspects of the present disclosure.

FIG. 12 illustrates a diagram of a system 1200 including a device 1205 that supports advanced coding for uplink and downlink transmissions in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting advanced coding for uplink and downlink transmissions). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a UE, control signaling indicating an erasure encoding pattern information associated with an erasure encoding scheme supported by the UE. The communications manager 1220 may be configured as or otherwise support a means for transmitting, to the UE, scheduling information that allocates a set of multiple resources on a shared channel for communication with the network entity. The communications manager 1220 may be configured as or otherwise support a means for transmitting or receiving a set of multiple TBs and erasure encoded parity information corresponding to the set of multiple TBs via the set of multiple resources on the shared channel according to an erasure encoding pattern in accordance with the erasure encoding pattern information.

By including or configuring the communications manager 1220 in accordance with examples as described herein, the device 1205 may support techniques for advanced coding for uplink and downlink transmissions, which may result in improved communication reliability, reduced latency, improved user experience related to reduced processing, reduced power consumption, more efficient utilization of communication resources, improved coordination between devices, longer battery life, improved utilization of processing capability, or other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of advanced coding for uplink and downlink transmissions as described herein, or the processor 1235 and the memory 1225 may be otherwise configured to perform or support such operations.

FIG. 13 illustrates a flowchart showing a method 1300 that supports advanced coding for uplink and downlink transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling indicating an erasure encoding pattern information associated with an erasure encoding scheme supported by the UE. The operations of 1305 may be performed in accordance with examples as disclosed herein. In some examples, aspects of the operations of 1305 may be performed by an erasure encoding pattern component 725 as described with reference to FIG. 7.

At 1310, the method may include receiving, from the network entity, scheduling information that allocates a set of multiple resources on a shared channel for communication with the network entity. The operations of 1310 may be performed in accordance with examples as disclosed herein. In some examples, aspects of the operations of 1310 may be performed by a scheduling information component 730 as described with reference to FIG. 7.

At 1315, the method may include transmitting or receiving a set of multiple TBs and erasure encoded parity information corresponding to the set of multiple TBs via the set of multiple resources on the shared channel according to an erasure encoding pattern in accordance with the erasure encoding pattern information. The operations of 1315 may be performed in accordance with examples as disclosed herein. In some examples, aspects of the operations of 1315 may be performed by an encoded communication manager 735 as described with reference to FIG. 7.

FIG. 14 illustrates a flowchart showing a method 1400 that supports advanced coding for uplink and downlink transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, control signaling indicating an erasure encoding pattern information associated with an erasure encoding scheme supported by the UE. The operations of 1405 may be performed in accordance with examples as disclosed herein. In some examples, aspects of the operations of 1405 may be performed by an erasure encoding pattern component 725 as described with reference to FIG. 7.

At 1410, the method may include receiving, from the network entity, scheduling information that allocates a set of multiple resources on a shared channel for communication with the network entity. The operations of 1410 may be performed in accordance with examples as disclosed herein. In some examples, aspects of the operations of 1410 may be performed by a scheduling information component 730 as described with reference to FIG. 7.

At 1415, the method may include transmitting UCI associated with the set of multiple resources including an indication of the erasure encoding pattern, where transmitting or receiving the set of multiple TBs and the erasure encoded parity information includes transmitting the set of multiple TBs and the erasure encoded parity information via a physical uplink shared channel. The operations of 1415 may be performed in accordance with examples as disclosed herein. In some examples, aspects of the operations of 1415 may be performed by a UCI component 750 as described with reference to FIG. 7.

At 1420, the method may include transmitting or receiving a set of multiple TBs and erasure encoded parity information corresponding to the set of multiple TBs via the set of multiple resources on the shared channel according to an erasure encoding pattern in accordance with the erasure encoding pattern information. The operations of 1420 may be performed in accordance with examples as disclosed herein. In some examples, aspects of the operations of 1420 may be performed by an encoded communication manager 735 as described with reference to FIG. 7.

FIG. 15 illustrates a flowchart showing a method 1500 that supports advanced coding for uplink and downlink transmissions in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, control signaling indicating an erasure encoding pattern information associated with an erasure encoding scheme supported by the UE. The operations of 1505 may be performed in accordance with examples as disclosed herein. In some examples, aspects of the operations of 1505 may be performed by an erasure encoding pattern component 1125 as described with reference to FIG. 11.

At 1510, the method may include transmitting, to the UE, scheduling information that allocates a set of multiple resources on a shared channel for communication with the network entity. The operations of 1510 may be performed in accordance with examples as disclosed herein. In some examples, aspects of the operations of 1510 may be performed by a scheduling information component 1130 as described with reference to FIG. 11.

At 1515, the method may include transmitting or receiving a set of multiple TBs and erasure encoded parity information corresponding to the set of multiple TBs via the set of multiple resources on the shared channel according to an erasure encoding pattern in accordance with the erasure encoding pattern information. The operations of 1515 may be performed in accordance with examples as disclosed herein. In some examples, aspects of the operations of 1515 may be performed by an encoded communication manager 1135 as described with reference to FIG. 11.

FIG. 16 illustrates a flowchart showing a method 1600 that supports advanced coding for uplink and downlink transmissions in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, control signaling indicating an erasure encoding pattern information associated with an erasure encoding scheme supported by the UE. The operations of 1605 may be performed in accordance with examples as disclosed herein. In some examples, aspects of the operations of 1605 may be performed by an erasure encoding pattern component 1125 as described with reference to FIG. 11.

At 1610, the method may include transmitting, to the UE, scheduling information that allocates a set of multiple resources on a shared channel for communication with the network entity. The operations of 1610 may be performed in accordance with examples as disclosed herein. In some examples, aspects of the operations of 1610 may be performed by a scheduling information component 1130 as described with reference to FIG. 11.

At 1615, the method may include receiving UCI associated with the set of multiple resources including an indication of the erasure encoding pattern, where transmitting or receiving the set of multiple TBs and the erasure encoded parity information includes receiving the set of multiple TBs and the erasure encoded parity information via a physical uplink shared channel. The operations of 1615 may be performed in accordance with examples as disclosed herein. In some examples, aspects of the operations of 1615 may be performed by a UCI component 1145 as described with reference to FIG. 11.

At 1620, the method may include transmitting or receiving a set of multiple TBs and erasure encoded parity information corresponding to the set of multiple TBs via the set of multiple resources on the shared channel according to an erasure encoding pattern in accordance with the erasure encoding pattern information. The operations of 1620 may be performed in accordance with examples as disclosed herein. In some examples, aspects of the operations of 1620 may be performed by an encoded communication manager 1135 as described with reference to FIG. 11.

The following provides an overview of aspects of the present disclosure:

Aspect 1: A method for wireless communications at a UE, comprising: receiving, from a network entity, control signaling indicating an erasure encoding pattern information associated with an erasure encoding scheme supported by the UE; receiving, from the network entity, scheduling information that allocates a plurality of resources on a shared channel for communication with the network entity; and transmitting or receiving a plurality of TBs and erasure encoded parity information corresponding to the plurality of TBs via the plurality of resources on the shared channel according to an erasure encoding pattern in accordance with the erasure encoding pattern information.

Aspect 2: The method of aspect 1, further comprising: receiving RRC signaling comprising the control signaling indicating the erasure encoding pattern information, the erasure encoding pattern information comprising a set of candidate erasure encoding patterns comprising the erasure encoding pattern; and receiving a DCI message comprising the scheduling information and an indication of the erasure encoding pattern of the set of candidate erasure encoding pattern.

Aspect 3: The method of any of aspects 1 through 2, further comprising: receiving a DCI message comprising the control signaling indicating the erasure encoding pattern information and the scheduling information, the erasure encoding pattern information comprising an indication of the erasure encoding pattern.

Aspect 4: The method of any of aspects 1 through 3, wherein transmitting or receiving the plurality of TBs and the erasure encoded parity information comprises: transmitting or receiving the plurality of TBs via a first subset of the plurality of resources prior to a threshold time according to the erasure encoding pattern; and transmitting or receiving the erasure encoded parity information via a second subset of the plurality of resources after the threshold time according to the erasure encoding pattern.

Aspect 5: The method of aspect 4, wherein the erasure encoding pattern information comprises an indication of the threshold time.

Aspect 6: The method of any of aspects 4 through 5, wherein the threshold time is defined with reference to a PDB corresponding to the plurality of TBs.

Aspect 7: The method of any of aspects 4 through 6, wherein the threshold time is defined with reference to a quantity of the first subset of the plurality of resources, a quantity of the plurality of TBs, or a combination thereof.

Aspect 8: The method of any of aspects 1 through 7, further comprising: transmitting UCI associated with the plurality of resources comprising an indication of the erasure encoding pattern, wherein transmitting or receiving the plurality of TBs and the erasure encoded parity information comprises transmitting the plurality of TBs and the erasure encoded parity information via a physical uplink shared channel.

Aspect 9: The method of aspect 8, further comprising: receiving, in the control signaling indicating the erasure encoding pattern information, an indication of a set of candidate erasure encoding patterns comprising the erasure encoding pattern; and selecting the erasure encoding pattern from the set of candidate erasure encoding patterns, wherein transmitting the UCI is based at least in part on the selecting.

Aspect 10: The method of any of aspects 8 through 9, further comprising: receiving, in the control signaling indicating the erasure encoding pattern information, an indication of a candidate erasure encoding pattern, wherein transmitting the UCI is based at least in part on the indication of a candidate erasure encoding pattern.

Aspect 11: The method of aspect 10, wherein the erasure encoding pattern is the same as the candidate erasure encoding pattern.

Aspect 12: The method of any of aspects 10 through 11, wherein the erasure encoding pattern is different than the candidate erasure encoding pattern.

Aspect 13: The method of any of aspects 1 through 12, further comprising: receiving, in the erasure encoding pattern information, an indication the erasure encoding pattern, the erasure encoding pattern comprising a first subset of the plurality of resources associated with the plurality of TBs and a second subset of the plurality of resources associated with the erasure encoded parity information.

Aspect 14: The method of any of aspects 1 through 13, further comprising: receiving, in the erasure encoding pattern information, an indication the erasure encoding pattern, the erasure encoding pattern comprising an encoder for generating the erasure encoded parity information according a combination of one or more TBs of the plurality TBs.

Aspect 15: The method of any of aspects 1 through 14, further comprising: receiving a DCI message comprising the scheduling information.

Aspect 16: The method of any of aspects 1 through 15, further comprising: receiving RRC signaling comprising CG uplink shared channel information, wherein the scheduling information comprises a DCI message activating the plurality of resources according to the CG uplink shared channel information.

Aspect 17: The method of any of aspects 1 through 16, wherein transmitting or receiving the plurality of TBs and erasure encoded parity information comprises: transmitting the plurality of TBs and erasure encoded parity information via an uplink shared channel according to the scheduling information.

Aspect 18: The method of any of aspects 1 through 17, wherein transmitting or receiving the plurality of TBs and erasure encoded parity information comprises: receiving the plurality of TBs and erasure encoded parity information via a downlink shared channel according to the scheduling information.

Aspect 19: A method for wireless communications at a network entity, comprising: transmitting, to a UE, control signaling indicating an erasure encoding pattern information associated with an erasure encoding scheme supported by the UE; transmitting, to the UE, scheduling information that allocates a plurality of resources on a shared channel for communication with the network entity; and transmitting or receiving a plurality of TBs and erasure encoded parity information corresponding to the plurality of TBs via the plurality of resources on the shared channel according to an erasure encoding pattern in accordance with the erasure encoding pattern information.

Aspect 20: The method of aspect 19, further comprising: transmitting RRC signaling comprising the control signaling indicating the erasure encoding pattern information, the erasure encoding pattern information comprising a set of candidate erasure encoding patterns comprising the erasure encoding pattern; and transmitting a DCI message comprising the scheduling information and an indication of the erasure encoding pattern of the set of candidate erasure encoding pattern.

Aspect 21: The method of any of aspects 19 through 20, further comprising: transmitting a DCI message comprising the control signaling indicating the erasure encoding pattern information and the scheduling information, the erasure encoding pattern information comprising an indication of the erasure encoding pattern.

Aspect 22: The method of any of aspects 19 through 21, wherein transmitting or receiving the plurality of TBs and the erasure encoded parity information comprises: transmitting or receiving the plurality of TBs via a first subset of the plurality of resources prior to a threshold time according to the erasure encoding pattern; and transmitting or receiving the erasure encoded parity information via a second subset of the plurality of resources after the threshold time according to the erasure encoding pattern.

Aspect 23: The method of aspect 22, wherein the erasure encoding pattern information comprises an indication of the threshold time.

Aspect 24: The method of any of aspects 22 through 23, wherein the threshold time is defined with reference to a PDB corresponding to the plurality of TBs.

Aspect 25: The method of any of aspects 22 through 24, wherein the threshold time is defined with reference to a quantity of the first subset of the plurality of resources, a quantity of the plurality of TBs, or a combination thereof.

Aspect 26: The method of any of aspects 19 through 25, further comprising: receiving UCI associated with the plurality of resources comprising an indication of the erasure encoding pattern, wherein transmitting or receiving the plurality of TBs and the erasure encoded parity information comprises receiving the plurality of TBs and the erasure encoded parity information via a physical uplink shared channel.

Aspect 27: The method of any of aspects 19 through 26, further comprising: transmitting, in the erasure encoding pattern information, an indication the erasure encoding pattern, the erasure encoding pattern comprising an encoder for generating the erasure encoded parity information according a combination of one or more TBs of the plurality TBs.

Aspect 28: The method of any of aspects 19 through 27, wherein transmitting the scheduling information comprises: transmitting a DCI message or a RRC message comprising CG uplink shared channel information.

Aspect 29: An apparatus for wireless communications at a UE, comprising a processor; memory coupled with the processor; and instructions stored in the memory and executable by the processor to cause the apparatus to perform a method of any of aspects 1 through 18.

Aspect 30: An apparatus for wireless communications at a UE, comprising at least one means for performing a method of any of aspects 1 through 18.

Aspect 31: A non-transitory computer-readable medium storing code for wireless communications at a UE, the code comprising instructions executable by a processor to perform a method of any of aspects 1 through 18.

Aspect 32: An apparatus for wireless communications at a network entity, comprising a processor; memory coupled with the processor; and instructions stored in the memory and executable by the processor to cause the apparatus to perform a method of any of aspects 19 through 28.

Aspect 33: An apparatus for wireless communications at a network entity, comprising at least one means for performing a method of any of aspects 19 through 28.

Aspect 34: A non-transitory computer-readable medium storing code for wireless communications at a network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories in electronic communication with the one or more processors; and
   instructions stored in the one or more memories, wherein the instructions are executable by the one or more processors to:
      receive, from a network entity, control signaling indicating an erasure encoding pattern information associated with an erasure encoding scheme supported by the UE;
      receive, from the network entity, scheduling information that allocates a plurality of resources on a shared channel for communication with the network entity; and
      transmit or receive a plurality of transport blocks and erasure encoded parity information corresponding to the plurality of transport blocks via the plurality of resources on the shared channel according to an erasure encoding pattern in accordance with the erasure encoding pattern information, wherein the erasure encoding pattern defines at least one of a location of encoded transmissions or contents of encoded transmissions.

2. The apparatus of claim 1, wherein the instructions are further executable by the one or more processors to:
   receive radio resource control signaling comprising the control signaling indicating the erasure encoding pattern information, the erasure encoding pattern information comprising a set of candidate erasure encoding patterns comprising the erasure encoding pattern; and
   receive a downlink control information message comprising the scheduling information and an indication of the erasure encoding pattern of the set of candidate erasure encoding patterns.

3. The apparatus of claim 1, wherein the instructions are further executable by the one or more processors to:
   receive a downlink control information message comprising the control signaling indicating the erasure encoding pattern information and the scheduling information, the erasure encoding pattern information comprising an indication of the erasure encoding pattern.

4. The apparatus of claim 1, wherein the instructions executable by the one or more processors to transmit or receive the plurality of transport blocks and the erasure encoded parity information comprise instructions executable by the one or more processors to:
   transmit or receive the plurality of transport blocks via a first subset of the plurality of resources prior to a threshold time according to the erasure encoding pattern; and
   transmit or receive the erasure encoded parity information via a second subset of the plurality of resources after the threshold time according to the erasure encoding pattern.

5. The apparatus of claim 4, wherein the erasure encoding pattern information comprises an indication of the threshold time.

6. The apparatus of claim 4, wherein the threshold time is defined with reference to a packet delay budget corresponding to the plurality of transport blocks.

7. The apparatus of claim 4, wherein the threshold time is defined with reference to a quantity of the first subset of the plurality of resources, a quantity of the plurality of transport blocks, or a combination thereof.

8. The apparatus of claim 1, wherein the instructions are further executable by the one or more processors to:

transmit uplink control information associated with the plurality of resources comprising an indication of the erasure encoding pattern, wherein transmitting or receiving the plurality of transport blocks and the erasure encoded parity information comprises transmitting the plurality of transport blocks and the erasure encoded parity information via a physical uplink shared channel.

9. The apparatus of claim 8, wherein the instructions are further executable by the one or more processors to:

receive, in the control signaling indicating the erasure encoding pattern information, an indication of a set of candidate erasure encoding patterns comprising the erasure encoding pattern; and select the erasure encoding pattern from the set of candidate erasure encoding patterns, wherein transmitting the uplink control information is based at least in part on the selecting.

10. The apparatus of claim 8, wherein the instructions are further executable by the one or more processors to:

receive, in the control signaling indicating the erasure encoding pattern information, an indication of a candidate erasure encoding pattern, wherein transmitting the uplink control information is based at least in part on the indication of a candidate erasure encoding pattern.

11. The apparatus of claim 10, wherein the erasure encoding pattern is the same as the candidate erasure encoding pattern.

12. The apparatus of claim 10, wherein the erasure encoding pattern is different than the candidate erasure encoding pattern.

13. The apparatus of claim 1, wherein the instructions are further executable by the one or more processors to:

receive, in the erasure encoding pattern information, an indication the erasure encoding pattern, the erasure encoding pattern comprising a first subset of the plurality of resources associated with the plurality of transport blocks and a second subset of the plurality of resources associated with the erasure encoded parity information.

14. The apparatus of claim 1, wherein the instructions are further executable by the one or more processors to:

receive, in the erasure encoding pattern information, an indication the erasure encoding pattern, the erasure encoding pattern comprising an encoder for generating the erasure encoded parity information according a combination of one or more transport blocks of the plurality of transport blocks.

15. The apparatus of claim 1, wherein the instructions are further executable by the one or more processors to:

receive a downlink control information message comprising the scheduling information.

16. The apparatus of claim 1, wherein the instructions are further executable by the one or more processors to:

receive radio resource control signaling comprising configured grant uplink shared channel information, wherein the scheduling information comprises a downlink control information message activating the plurality of resources according to the configured grant uplink shared channel information.

17. The apparatus of claim 1, wherein the instructions executable by the one or more processors to transmit or receive the plurality of transport blocks and erasure encoded parity information comprise instructions executable by the one or more processors to:

transmit the plurality of transport blocks and erasure encoded parity information via an uplink shared channel according to the scheduling information.

18. The apparatus of claim 1, wherein the instructions executable by the one or more processors to transmit or receive the plurality of transport blocks and erasure encoded parity information comprise instructions executable by the one or more processors to:

receive the plurality of transport blocks and erasure encoded parity information via a downlink shared channel according to the scheduling information.

19. An apparatus for wireless communications at a network entity, comprising:

one or more processors;

one or more memories in electronic communication with the one or more processors; and instructions stored in the one or more memories, wherein the instructions are executable by the one or more processors to:

transmit, to a user equipment (UE), control signaling indicating an erasure encoding pattern information associated with an erasure encoding scheme supported by the UE;

transmit, to the UE, scheduling information that allocates a plurality of resources on a shared channel for communication with the network entity; and transmit or receive a plurality of transport blocks and erasure encoded parity information corresponding to the plurality of transport blocks via the plurality of resources on the shared channel according to an erasure encoding pattern in accordance with the erasure encoding pattern information, wherein the erasure encoding pattern defines at least one of a location of encoded transmissions or contents of encoded transmissions.

20. The apparatus of claim 19, wherein the instructions are further executable by the one or more processors to:

transmit radio resource control signaling comprising the control signaling indicating the erasure encoding pattern information, the erasure encoding pattern information comprising a set of candidate erasure encoding patterns comprising the erasure encoding pattern; and transmit a downlink control information message comprising the scheduling information and an indication of the erasure encoding pattern of the set of candidate erasure encoding patterns.

21. The apparatus of claim 19, wherein the instructions are further executable by the one or more processors to:

transmit a downlink control information message comprising the control signaling indicating the erasure encoding pattern information and the scheduling information, the erasure encoding pattern information comprising an indication of the erasure encoding pattern.

22. The apparatus of claim 19, wherein the instructions executable by the one or more processors to transmit or receive the plurality of transport blocks and the erasure encoded parity information comprise instructions executable by the one or more processors to:

transmit or receive the plurality of transport blocks via a first subset of the plurality of resources prior to a threshold time according to the erasure encoding pattern; and transmit or receive the erasure encoded parity information via a second subset of the plurality of resources after the threshold time according to the erasure encoding pattern.

23. The apparatus of claim 22, wherein the erasure encoding pattern information comprises an indication of the threshold time.

24. The apparatus of claim 22, wherein the threshold time is defined with reference to a packet delay budget corresponding to the plurality of transport blocks.

25. The apparatus of claim 22, wherein the threshold time is defined with reference to a quantity of the first subset of the plurality of resources, a quantity of the plurality of transport blocks, or a combination thereof.

26. The apparatus of claim 19, wherein the instructions are further executable by the one or more processors to:

receive uplink control information associated with the plurality of resources comprising an indication of the erasure encoding pattern, wherein transmitting or receiving the plurality of transport blocks and the erasure encoded parity information comprises receiving the plurality of transport blocks and the erasure encoded parity information via a physical uplink shared channel.

27. The apparatus of claim 19, wherein the instructions are further executable by the one or more processors to:

transmit, in the erasure encoding pattern information, an indication the erasure encoding pattern, the erasure encoding pattern comprising an encoder for generating the erasure encoded parity information according a combination of one or more transport blocks of the plurality of transport blocks.

28. The apparatus of claim 19, wherein the instructions executable by the one or more processors to transmit the scheduling information comprise instructions executable by the one or more processors to:

transmit a downlink control information message or a radio resource control message comprising configured grant uplink shared channel information.

29. A method for wireless communications at a user equipment (UE), comprising:

receiving, from a network entity, control signaling indicating an erasure encoding pattern information associated with an erasure encoding scheme supported by the UE;

receiving, from the network entity, scheduling information that allocates a plurality of resources on a shared channel for communication with the network entity; and transmitting or receiving a plurality of transport blocks and erasure encoded parity information corresponding to the plurality of transport blocks via the plurality of resources on the shared channel according to an erasure encoding pattern in accordance with the erasure encoding pattern information, wherein the erasure encoding pattern defines at least one of a location of encoded transmissions or contents of encoded transmissions.

30. A method for wireless communications at a network entity, comprising:

transmitting, to a user equipment (UE), control signaling indicating an erasure encoding pattern information associated with an erasure encoding scheme supported by the UE;

transmitting, to the UE, scheduling information that allocates a plurality of resources on a shared channel for communication with the network entity; and transmitting or receiving a plurality of transport blocks and erasure encoded parity information corresponding to the plurality of transport blocks via the plurality of resources on the shared channel according to an erasure encoding pattern in accordance with the erasure encoding pattern information, wherein the erasure encoding pattern defines at least one of a location of encoded transmissions or contents of encoded transmissions.

* * * * *